(12) United States Patent
Guay

(10) Patent No.: US 12,168,290 B2
(45) Date of Patent: Dec. 17, 2024

(54) HEALTH AND SAFETY HANDLE

(71) Applicant: Patrice Guay, Bourget (CA)

(72) Inventor: Patrice Guay, Bourget (CA)

( * ) Notice: Subject to any disclaimer, the term of this patent is extended or adjusted under 35 U.S.C. 154(b) by 0 days.

(21) Appl. No.: 17/606,140

(22) PCT Filed: Apr. 24, 2020

(86) PCT No.: PCT/CA2020/050544
§ 371 (c)(1),
(2) Date: Oct. 25, 2021

(87) PCT Pub. No.: WO2020/215162
PCT Pub. Date: Oct. 29, 2020

(65) Prior Publication Data
US 2022/0143805 A1 May 12, 2022

Related U.S. Application Data

(60) Provisional application No. 62/839,206, filed on Apr. 26, 2019.

(51) Int. Cl.
*B25G 1/10* (2006.01)
*B25G 1/04* (2006.01)
(Continued)

(52) U.S. Cl.
CPC ............ *B25G 1/102* (2013.01); *B25G 1/04* (2013.01); *B60N 3/02* (2013.01); *F16M 11/041* (2013.01);
(Continued)

(58) Field of Classification Search
CPC ...... F16M 11/041; F16M 11/00; F16M 11/38; F16M 13/04; B25G 1/102; B25G 1/04; B25G 7/12; B25G 1/12; A47F 13/06
(Continued)

(56) References Cited

U.S. PATENT DOCUMENTS 1,686,889 A * 10/1928 Woods .................. A01K 97/14
  294/26
3,645,212 A * 2/1972 Dahlstrom ............... B60N 3/02
  105/354
(Continued)

FOREIGN PATENT DOCUMENTS

CN 101079224 A 11/2007
CN 203528353 U 4/2014
(Continued)

OTHER PUBLICATIONS

English language Abstract of CN205498702U.
(Continued)

*Primary Examiner* — Alfred J Wujciak
(74) *Attorney, Agent, or Firm* — Ware, Fressola, Maguire & Barber LLP

(57) ABSTRACT

A health and safety handle embodied as a multi-purpose rail-gripping device comprises a main handle member ergonomically shaped to be grasped by a user/rider, a rail-gripping arm connected to a first end of the handle, and a holder that is movable relative to the main handle member between a stowed position and a deployed position to hold an object while the main handle member is being grasped. The rail-gripping arm has a gripper to grip a grab rail, pole or bar in a public transit vehicle such as a bus, train, subway, streetcar) to stabilize the rider while isolating the rider's hands from contaminants or health hazards potentially present on the rail/pole/bar. The handle may also include a hook for suspending objects (e.g. backpack, bag, umbrella, etc.). The handle may include magnetic and/or mechanical retention elements for retaining one or multiple other objects/accessories, e.g. beverage container, smartphone or other items.

9 Claims, 27 Drawing Sheets

(51) Int. Cl.
*B60N 3/02* (2006.01)
*F16M 11/04* (2006.01)
*F16M 11/10* (2006.01)
*F16M 11/38* (2006.01)
*F16M 13/04* (2006.01)

(52) U.S. Cl.
CPC ............. *F16M 11/10* (2013.01); *F16M 11/38* (2013.01); *F16M 13/04* (2013.01)

(58) Field of Classification Search
USPC ...................... 81/15.9, 3.8; 294/26
See application file for complete search history.

(56) References Cited

U.S. PATENT DOCUMENTS

| | | | | |
|---|---|---|---|---|
| 5,202,710 | A * | 4/1993 | Perkins | G09F 7/04 351/218 |
| 5,487,576 | A * | 1/1996 | DuVivier | B25B 9/00 294/210 |
| 6,293,601 | B1 * | 9/2001 | Johnson | A01K 97/24 294/175 |
| 6,499,778 | B2 * | 12/2002 | Boulay | B25B 9/00 254/134.3 R |
| 6,652,013 | B1 * | 11/2003 | Peterson | B25G 1/04 294/210 |
| 7,478,851 | B2 * | 1/2009 | Geller | B25G 1/04 294/24 |
| 7,566,292 | B1 * | 7/2009 | Hauser | A63B 21/4017 482/40 |
| 7,706,212 | B1 * | 4/2010 | Campbell | G01S 15/04 367/116 |
| 2014/0035305 | A1 * | 2/2014 | Ludwig | B25J 1/04 294/200 |
| 2014/0259474 | A1 * | 9/2014 | Sokol | A61C 17/3418 15/22.2 |
| 2019/0011218 | A1 * | 1/2019 | Moran | F41B 15/02 |
| 2019/0075922 | A1 * | 3/2019 | Rivera | A46B 17/08 |
| 2020/0016622 | A1 * | 1/2020 | Torlei | B05B 15/652 |

FOREIGN PATENT DOCUMENTS

| | | |
|---|---|---|
| CN | 205498702 U | 8/2016 |
| CN | 205890642 U | 1/2017 |
| CN | 207796503 U | 8/2018 |
| CN | 208006801 U | 10/2018 |
| CN | 208827676 U | 5/2019 |
| CN | 209426631 U | 9/2019 |
| KR | 101464080 B1 | 11/2014 |
| WO | 2018035727 A1 | 3/2018 |

OTHER PUBLICATIONS

English language Abstract of CN208006801U.
English language Abstract of CN203528353U.
English language Abstract of CN209426631U.
English language Abstract of CN205890642U.
English language Abstract of KR101464080B1.
English language Abstract of CN208827676U.
English language Abstract of 207796503U.
English language Abstract of WO2018035727A1.
English language Abstract of CN101079224A.

* cited by examiner

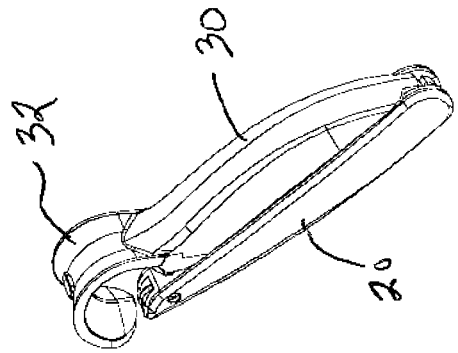
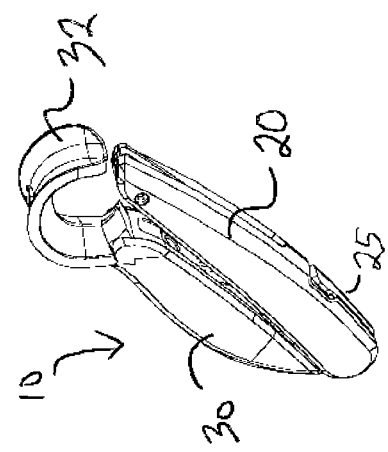
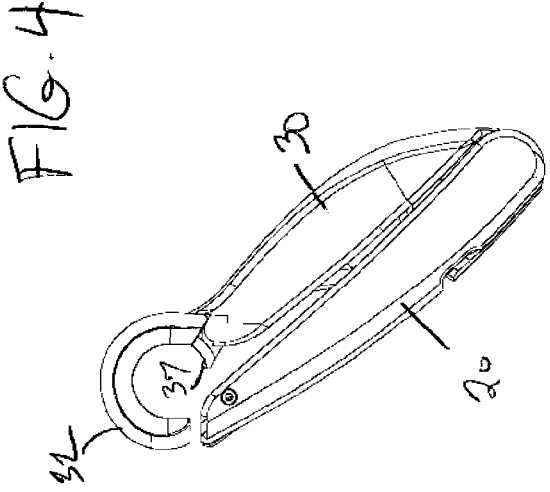
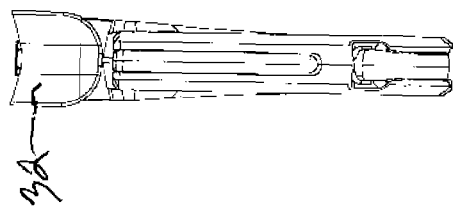

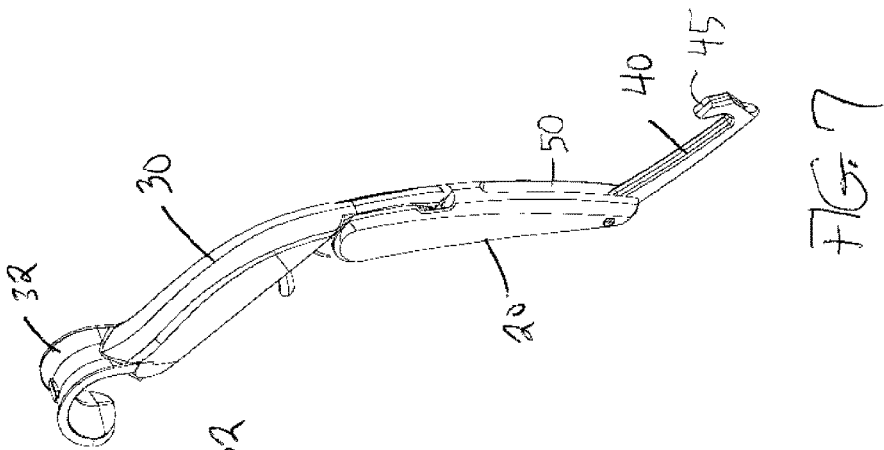
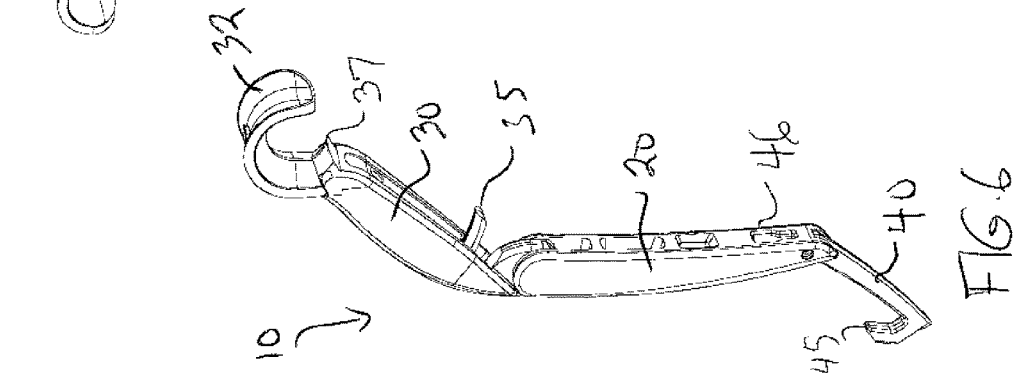
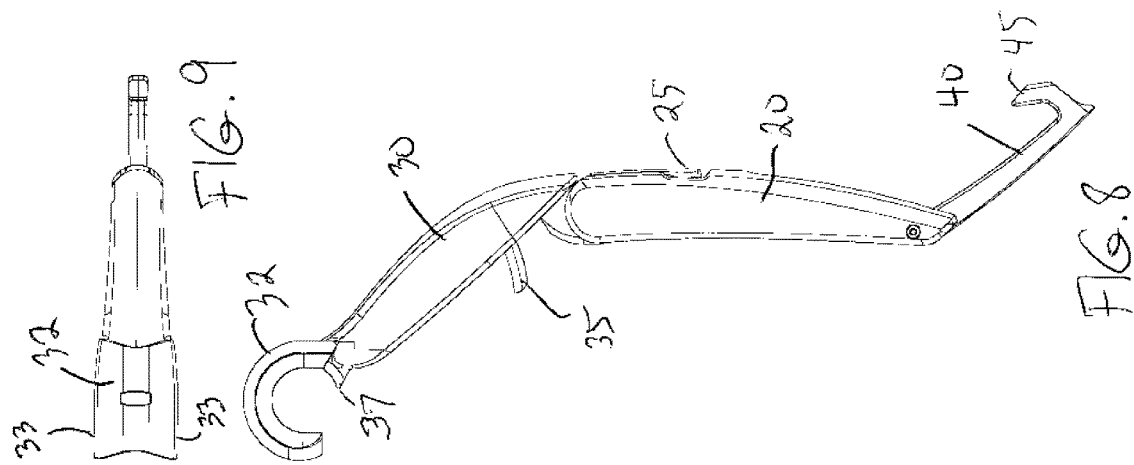
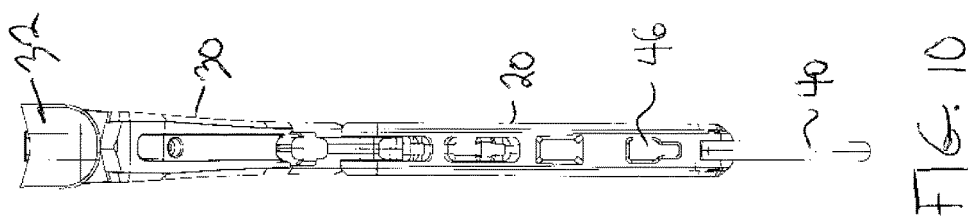

HEALTH AND SAFETY HANDLE

CROSS-REFERENCE TO RELATED APPLICATIONS

This application claims priority from U.S. Patent Application 62/839,206 entitled "Multipurpose Rail-Gripping Device" filed Apr. 26, 2019, the contents of which are hereby incorporated by reference.

TECHNICAL FIELD

The present invention relates generally to handles, supports, rails and other such devices enabling a user to grasp while standing to provide balance and stability but also to keep hands away from surfaces that are potentially soiled and/or infected by live viruses, bacteria and/or other communicable diseases.

BACKGROUND

Many public transit vehicles such as buses and subway cars have horizontal grab rails and vertical poles for riders to grasp to provide balance and stability while standing. These rails and poles are typically metal cylindrical structures.

Especially in instances when the bus or subway car is full, there may be inadequate access to the rails and poles, leaving some riders without proper support while standing which is a hazard to their own safety and that of other riders. Even when there is sufficient access to a rail or pole, the rail or pole may constitute potential health hazards in that it may be soiled/infected, and thus can transmit infectious and communicable diseases from one rider to another. Furthermore, daily riders typically carry a bag (i.e. schoolbag, computer bag, purse, satchel, etc.), a beverage container (i.e. coffee mug) and their smartphone with them. It then becomes difficult for the riders to perform concurrent tasks like holding their bag, purse or briefcase, holding their beverage (e.g. morning coffee) and interacting with a phone, all while holding the rail safely for them and other passengers. If the rider is holding multiple items such as a phone, bag and beverage in his or her hands, the rider may be unable to properly hold the bar. This may represent a hazard in terms of flying objects and/or persons when the bus or subway suddenly stops, turns or accelerates. Similarly, a rider carrying a bag or drink with one hand while holding the rail with the other hand would be unable to text or otherwise interact with his or her phone.

An invention that addresses these issues would be highly desirable in order to make users' ride on public transit safer, healthier, more hygienic, more enjoyable and comfortable.

SUMMARY

In general, the present invention is a health and safety handle that enables a user to ride safely on a public transit vehicle. The health and safety handle grips or attaches to a rail or bar inside the public transit vehicle to provide rider stability while also isolating the user's hands from the potentially contaminated rail or bar.

For the purposes of this specification, all such stabilizing structures (rails, poles, bars, etc.) shall be referred to collectively as "rails" for the sake of simplicity and it will be understood that the rails may be vertical, horizontal or angled obliquely.

The health and safety handle may be embodied in the form of a multi-purpose rail-gripping device that comprises a main handle member ergonomically shaped to be grasped by a user and a rail-gripping arm connected to a first end of the main handle member. The rail-gripping arm has a gripper adapted to grip a cylindrically-shaped rail. The gripper may optionally have flared lateral portions or have a pivoting/swiveling mechanism, e.g. a universal joint, a ball joint or a pivot, to enable the rail-gripping arm to swivel, pivot or rotate within a range of angles relative to the rail, mimicking the motion of a strap, thereby alleviating undesirably high torque on the rail-gripping arm and/or the gripper. The health and safety handle also includes one or several hooks for suspending objects (e.g. a bag, jacket, laptop computer carrying case, or other personal item). The health and safety handle may also include one or several magnetic/mechanical systems for holding or retaining accessories including but not limited to containers (e.g. beverage containers), cup holders, smartphones, digital cameras, etc. The health and safety handle may have other features or elements as described below.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed below. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which:

FIG. 1 is a first perspective view of a health and safety handle in accordance with an embodiment of the present invention, the handle being shown in its closed posture.

FIG. 2 is a second perspective view of the health and safety handle of FIG. 1.

FIG. 3 is a side view of the health and safety handle of FIG. 1.

FIG. 4 is a top view of the health and safety handle of FIG. 1.

FIG. 5 is a front view of the health and safety handle of FIG. 1.

FIG. 6 is a first perspective view of the health and safety handle of FIG. 1 in its open posture.

FIG. 7 is a second perspective view of the health and safety handle of FIG. 1 in its open posture.

FIG. 8 is a side view of the health and safety handle of FIG. 1 in its open posture.

FIG. 9 is a top view of the health and safety handle of FIG. 1 in its open posture.

FIG. 10 is a front view of the health and safety handle of FIG. 1 in its open posture.

It will be noted that throughout the appended drawings, like features are identified by like reference numerals.

DETAILED DESCRIPTION

Figure 11:
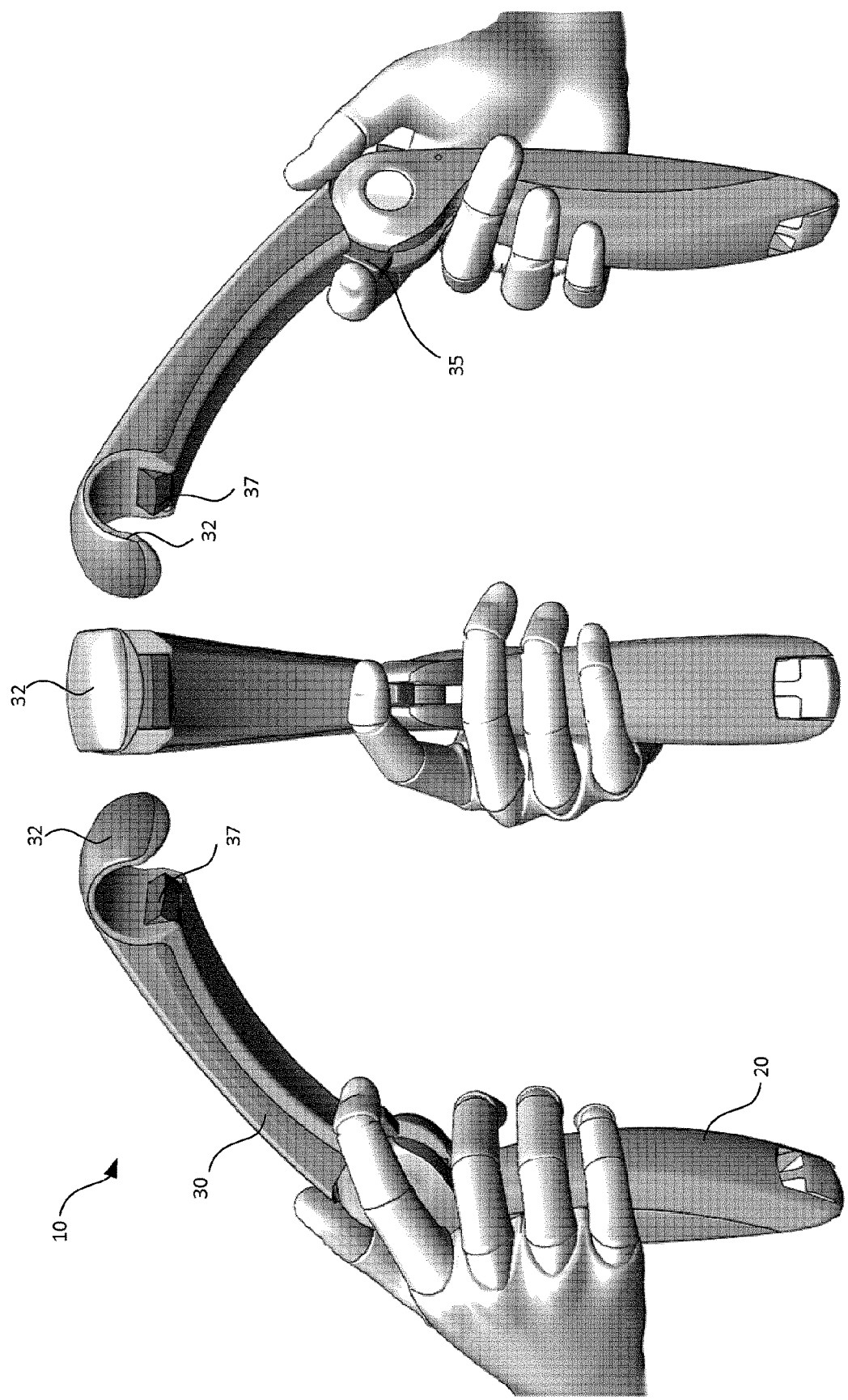
FIG. 11 depicts a health and safety handle in accordance with another embodiment of the present invention in which the rail-gripping arm is in its open posture.
Figure 12:
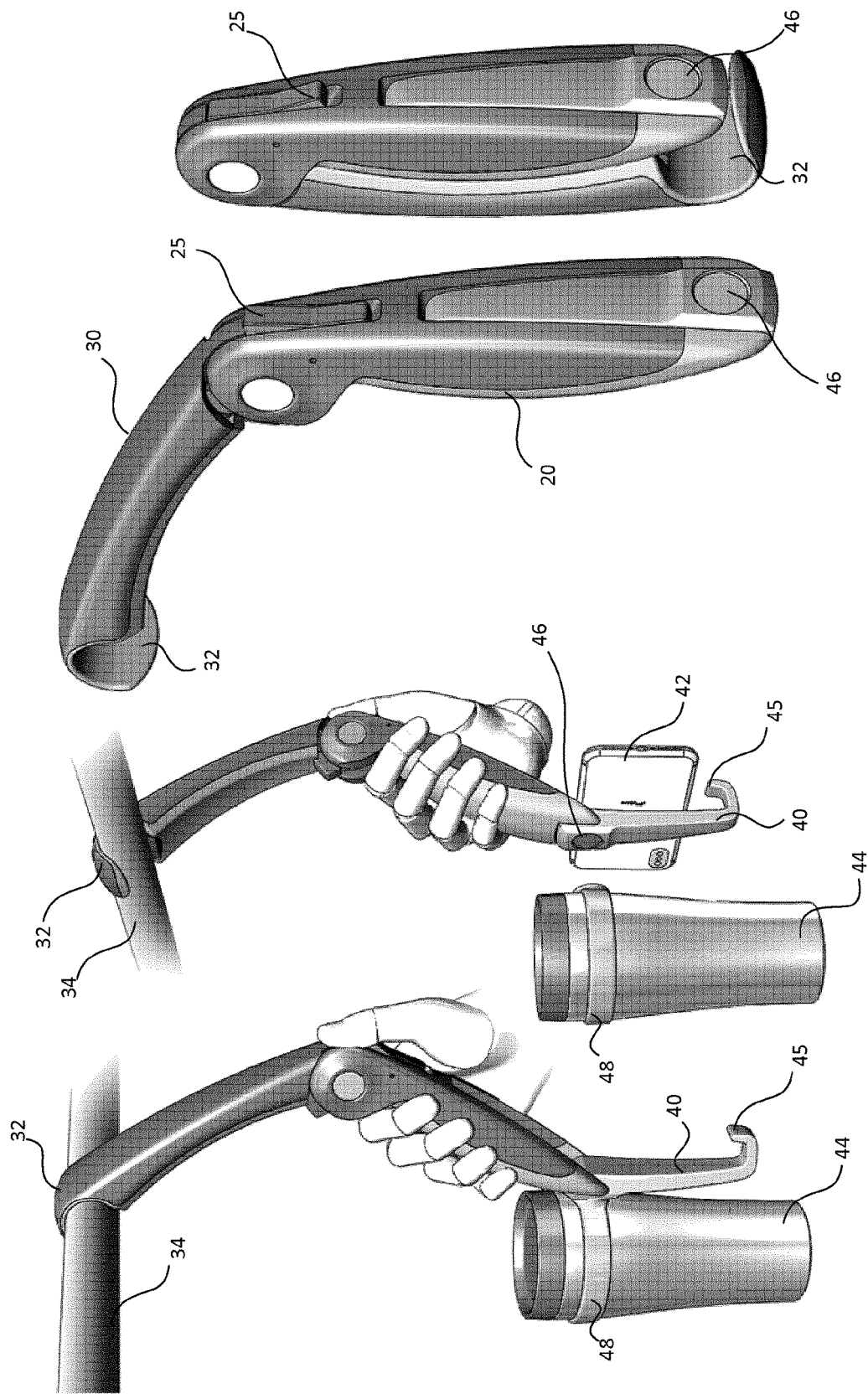
FIG. 12 depicts an example use of the health and safety handle attached to a grab rail while holding a mobile communication device and a beverage container.
Figure 13:
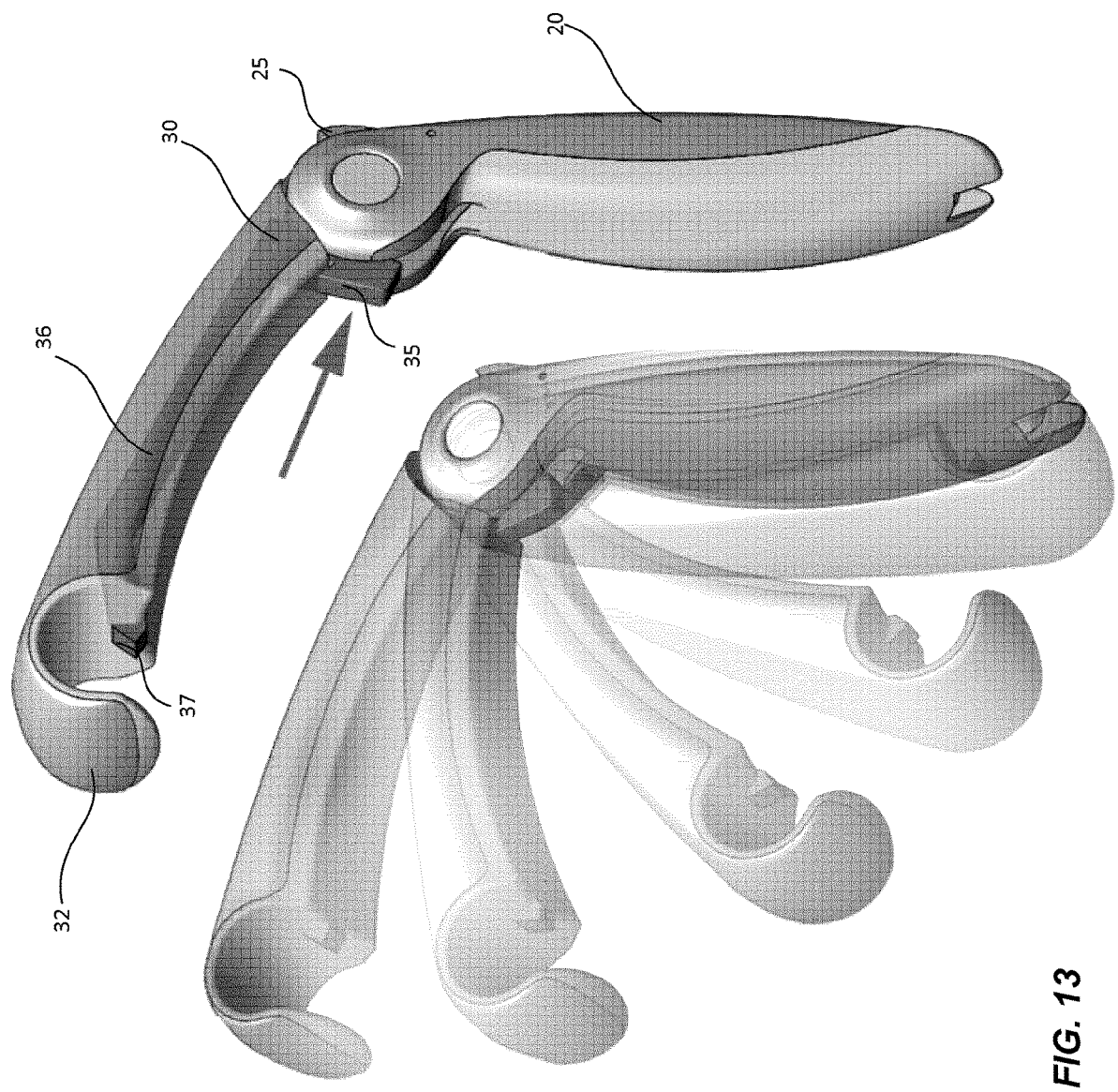
FIG. 13 depicts an example of the health and safety handle having a grip-releasing button to release the gripper in accordance with one embodiment.
Figure 14:
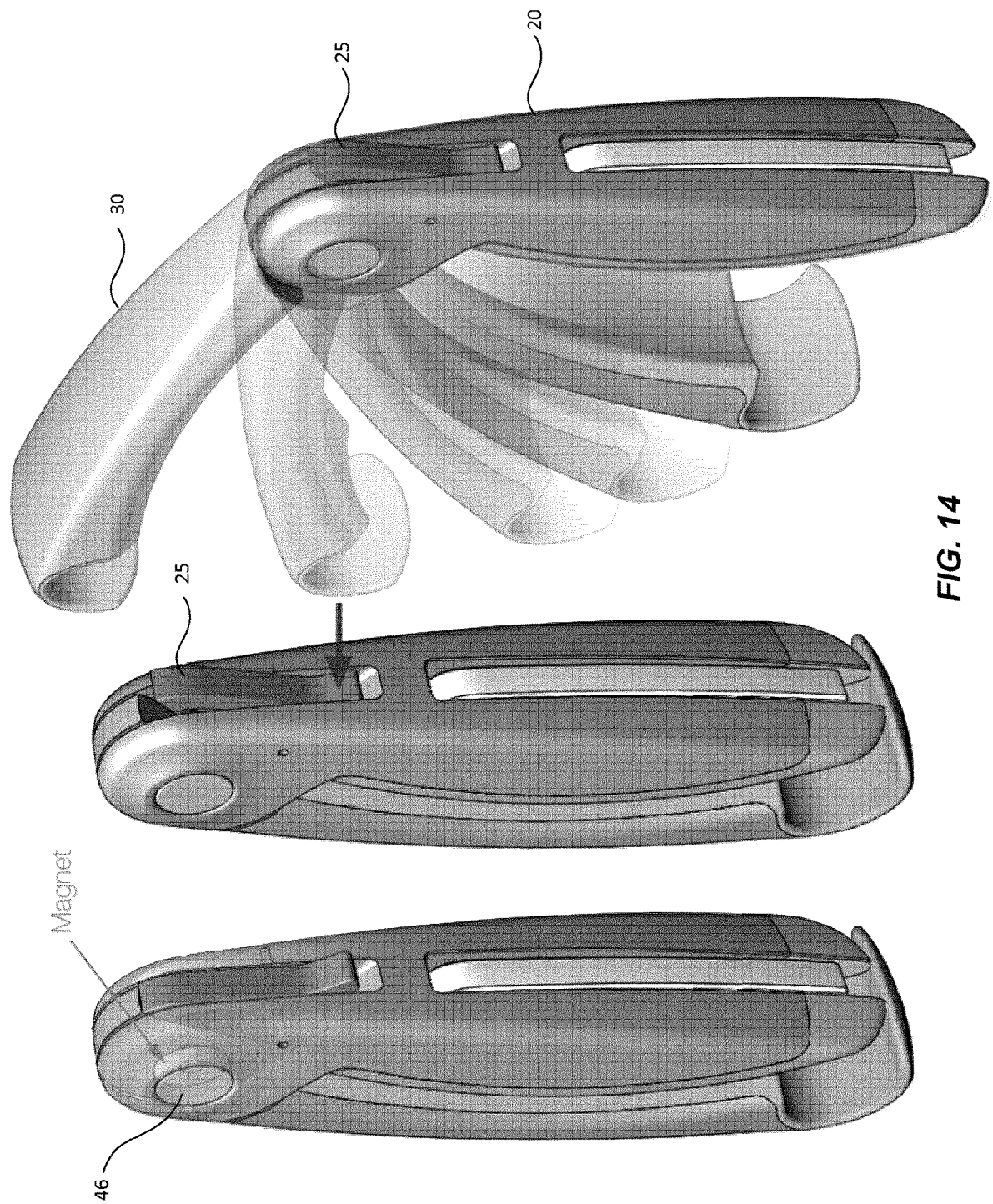
FIG. 14 depicts an example of the health and safety handle being deployed using an arm-deploying trigger in accordance with another embodiment.
Figure 15:
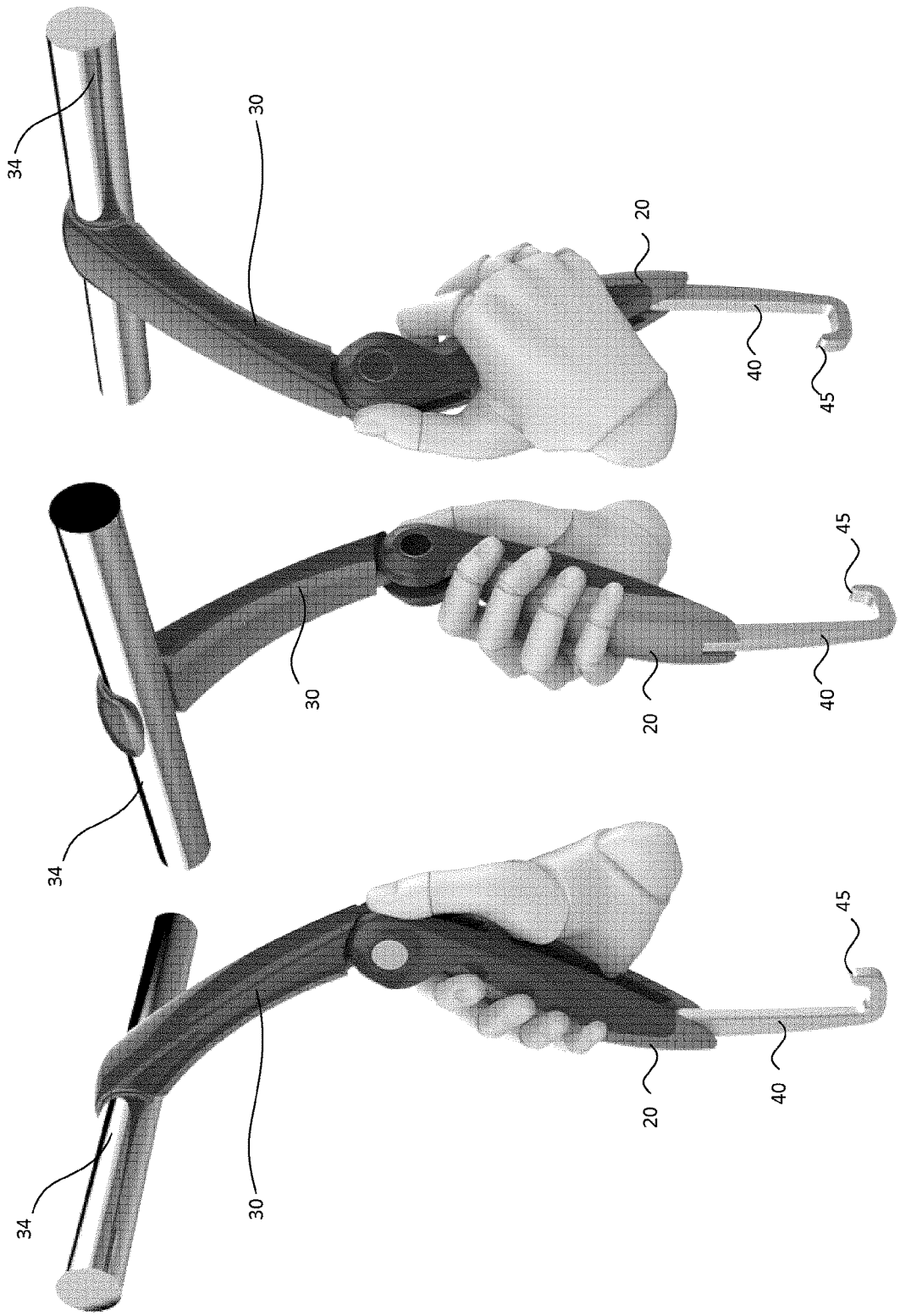
FIG. 15 depicts another example use of the health and safety handle gripping a grab rail and with the bag hook deployed.
Figure 16:
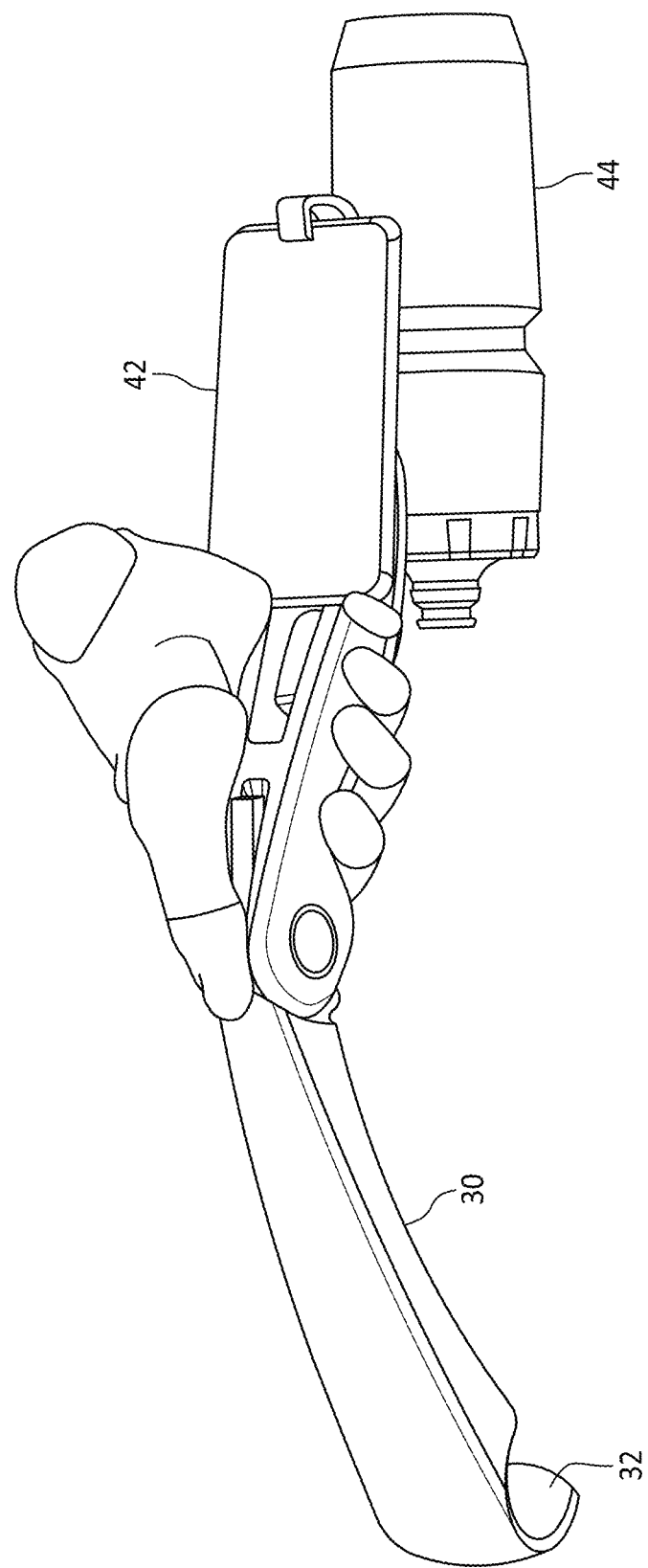
FIG. 16 depicts another example use of the health and safety handle holding a mobile communication device and a water bottle.
Figure 17:
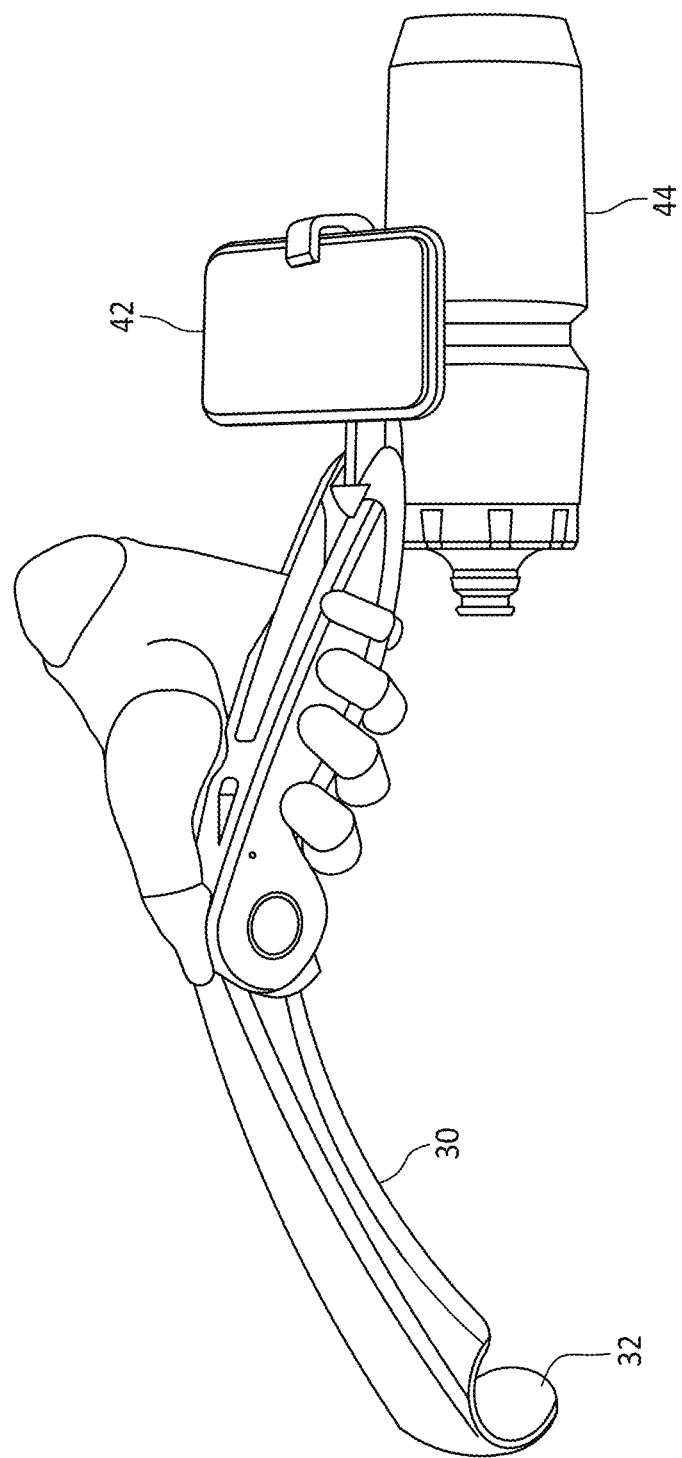
FIG. 17 depicts another example use of the health and safety handle holding a mobile communication device in a landscape orientation and a water bottle.
Figure 18:
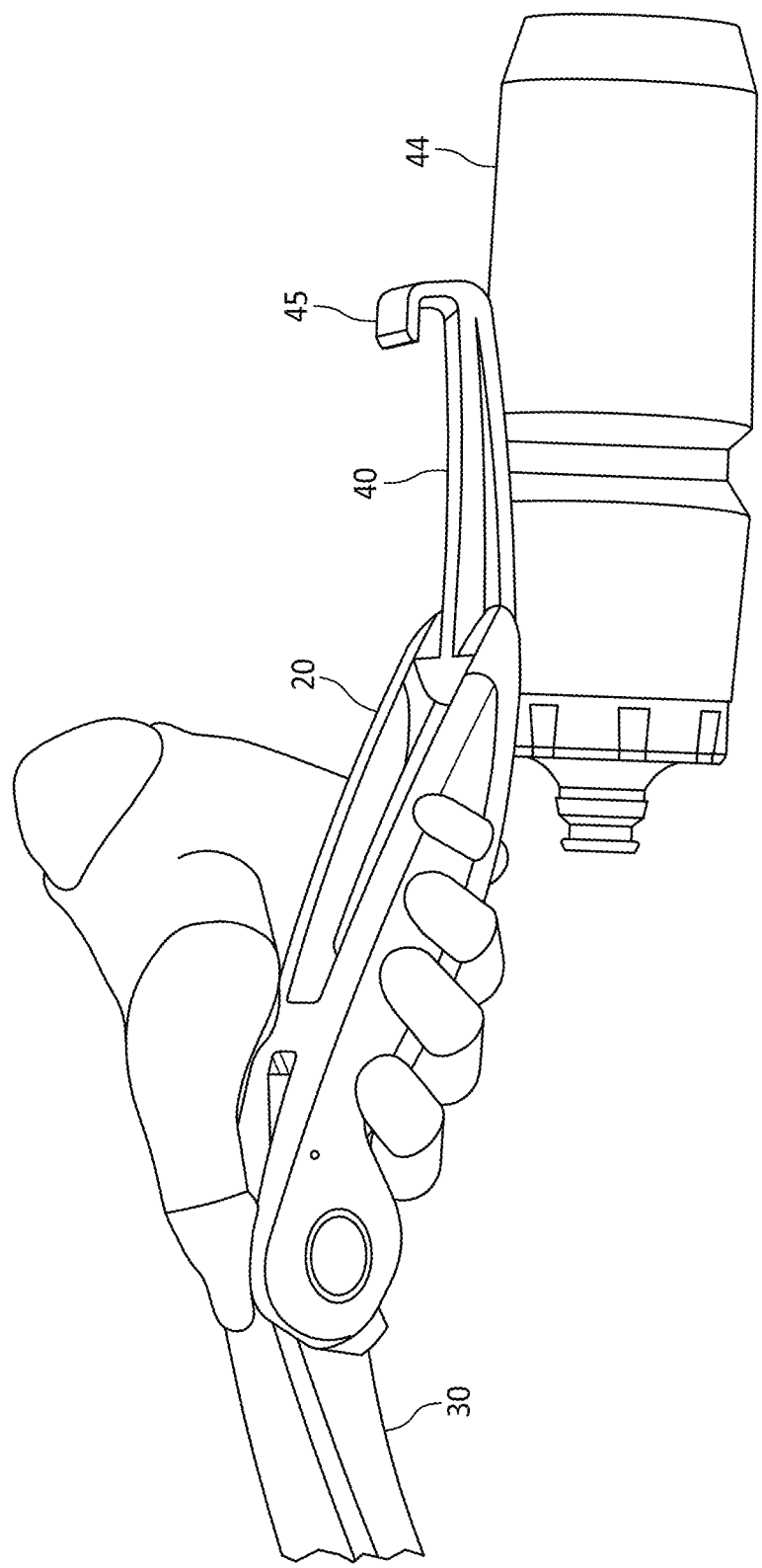
FIG. 18 depicts another example use of the health and safety handle holding a water bottle.
Figure 19:
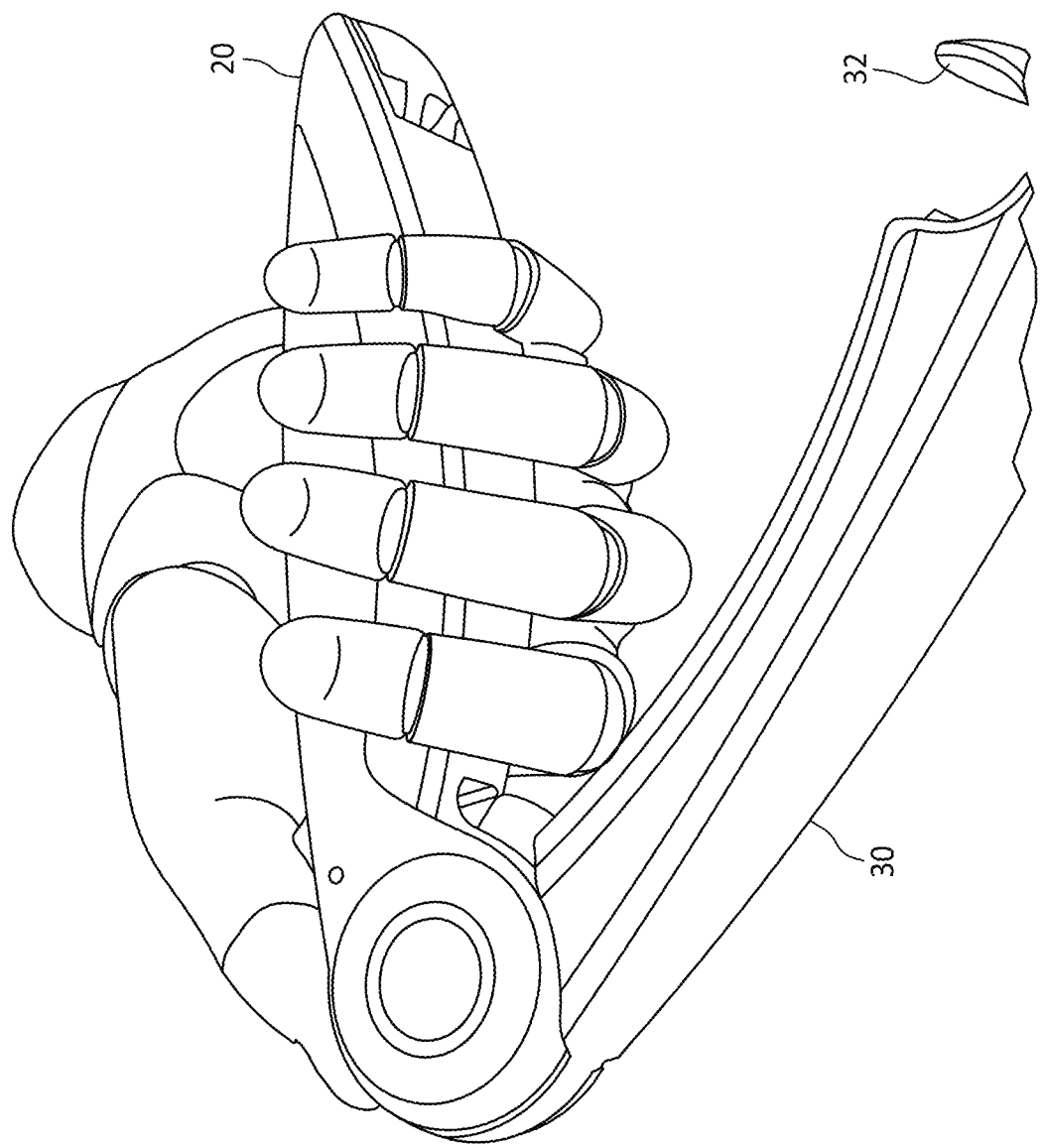
FIG. 19 depicts a user triggering a releasable locking mechanism in accordance with one embodiment.
Figure 20:
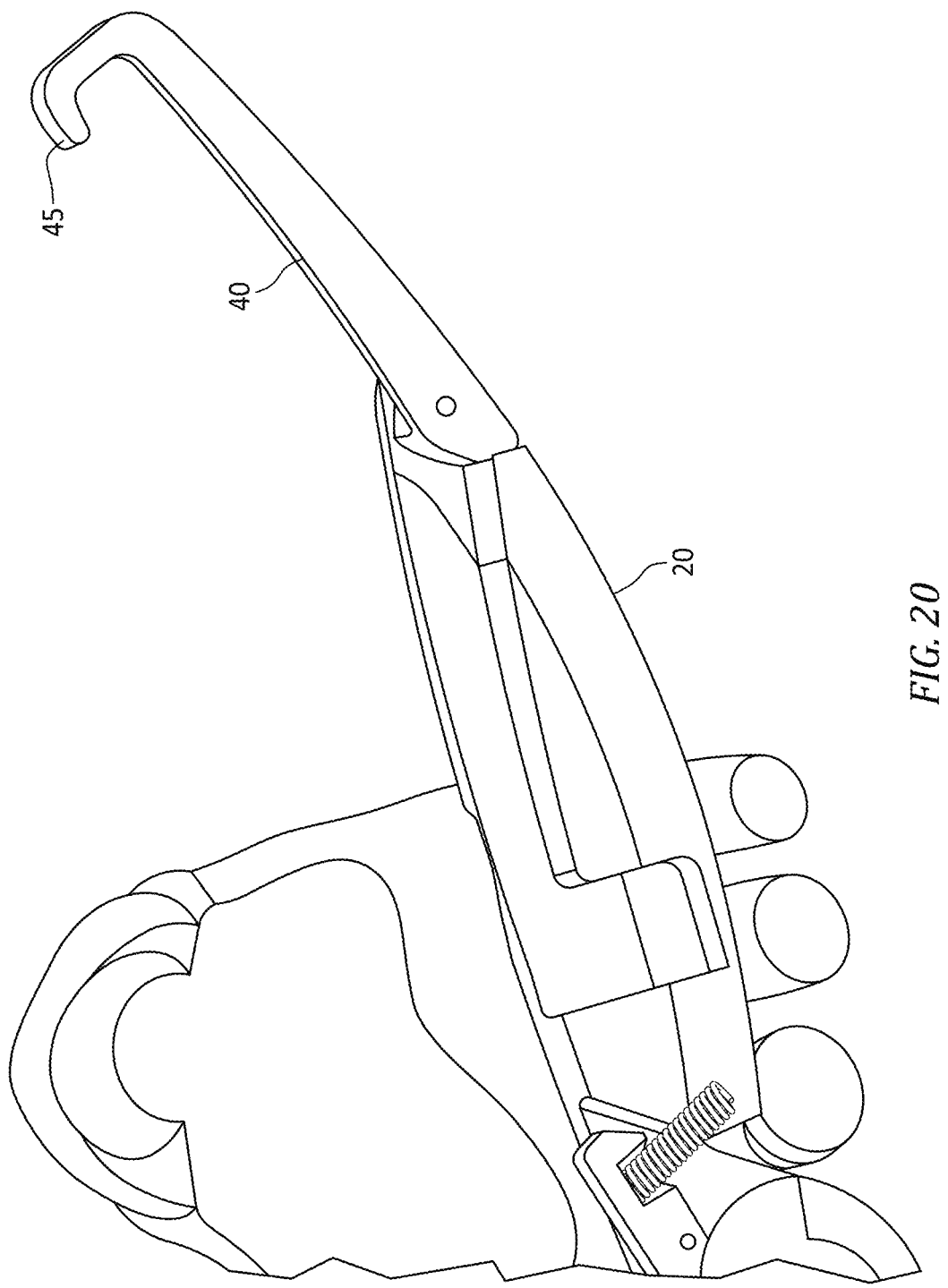
FIG. 20 depicts an internal spring used to mechanically bias a locking member as one example of a releasable locking mechanism.
Figure 21:
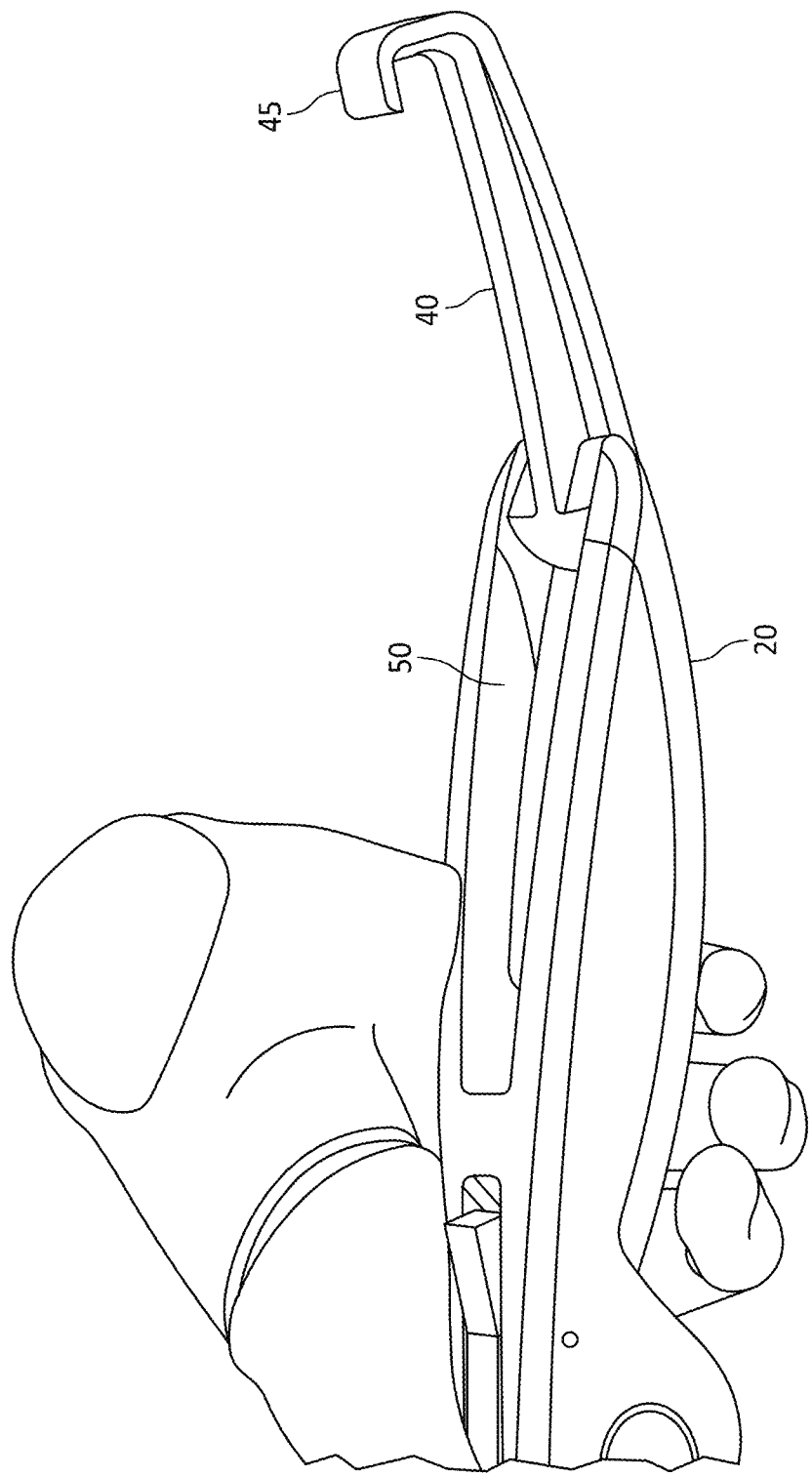
FIG. 21 depicts a cavity into which the holder may be folded in one embodiment.
Figure 22:
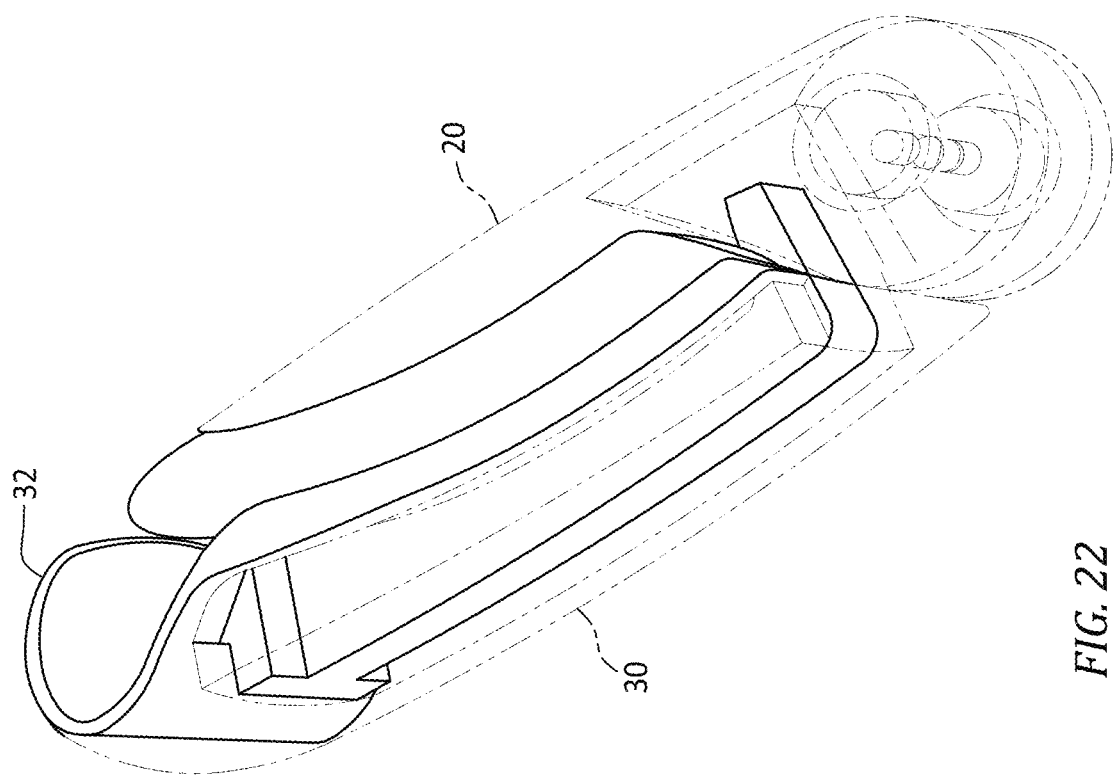
FIG. 22 is a cutaway view showing internal details of one embodiment of the health and safety handle.
Figure 23:
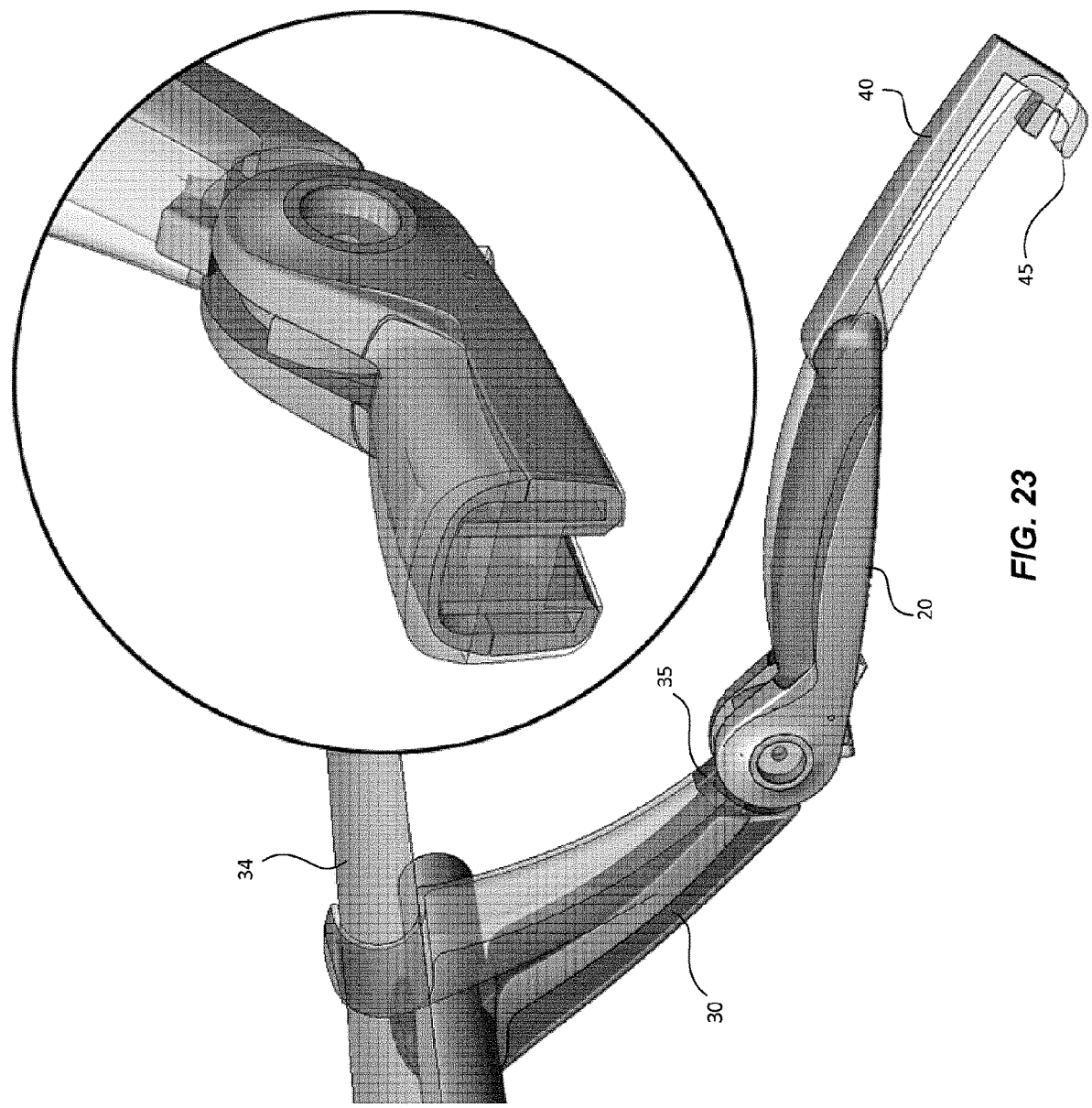
FIG. 23 is a cutaway view showing internal details in accordance with one embodiment of the health and safety handle.
Figure 24:
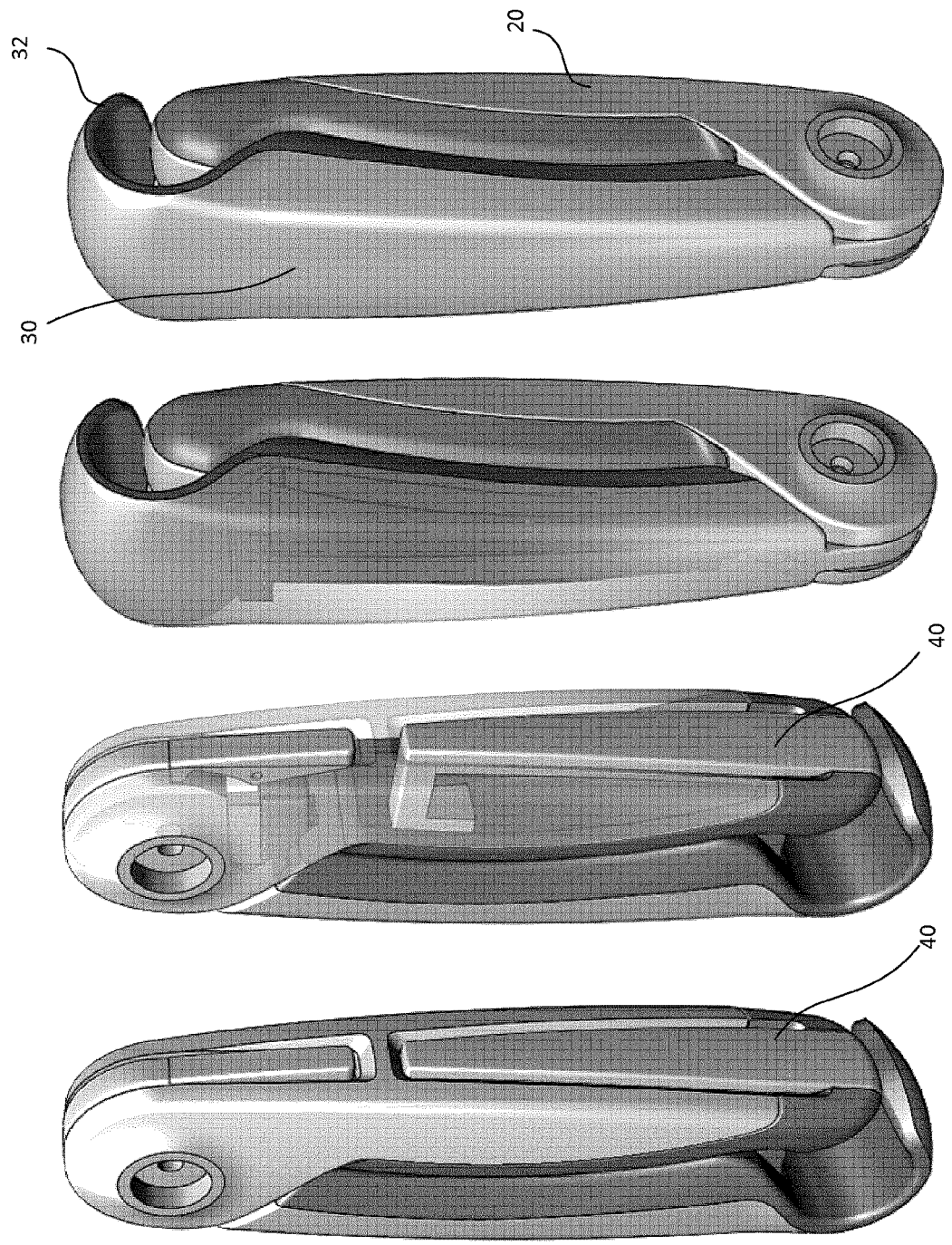
FIG. 24 depicts internal details of the releasable locking mechanism in accordance with one embodiment of the health and safety handle.
Figure 25:
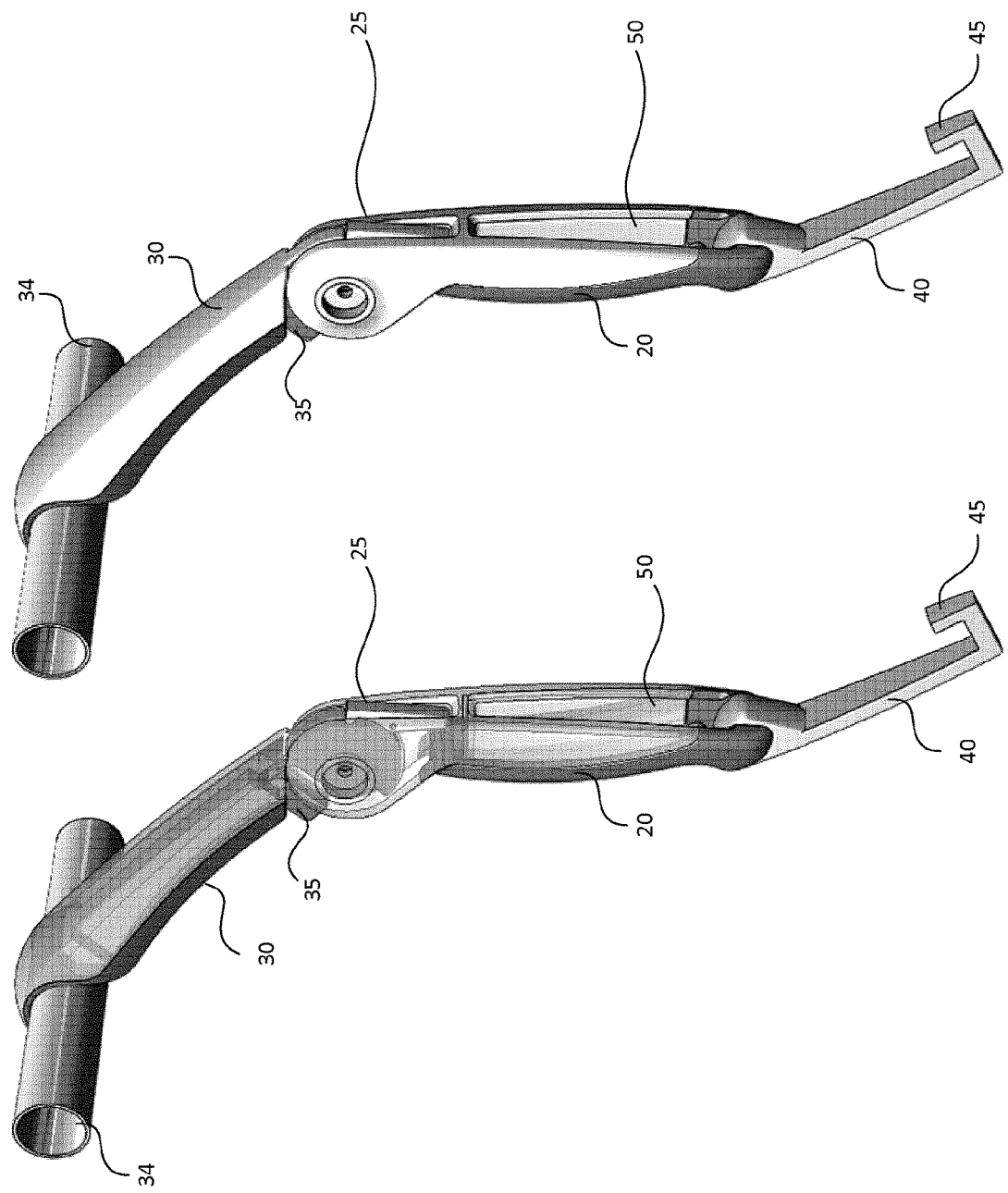
FIG. 25 also depicts internal details of the releasable locking mechanism in accordance with one embodiment of the health and safety handle.

Disclosed herein is a health and safety handle which may be embodied as a multi-purpose rail-gripping device. Exemplary embodiments of the health and safety handle are depicted in the drawings. The health and safety handle is denoted generally by reference numeral 10 in FIGS. 1-30. The device 10 shown by way of example in FIGS. 1-30 comprises a main handle member 20 ergonomically shaped to be grasped by a user (i.e. by a single hand or both hands of the user or rider). The health and safety handle 10 includes a rail-gripping arm 30 connected (e.g. movably connected) to a first end of the main handle member 20. As will be described in further detail below, the rail-gripping arm 30 unfolds by rotating relative to the main handle member 20 as shown in the figures. Optionally, the health and safety handle 10 includes an arm-deploying trigger 25 to unfold (i.e. to deploy) the rail-gripping arm 30. As will be described in further detail below, the rail-gripping arm 30 has a gripper 32 to grip, connect or attach to a rail 34. Optionally, the health and safety handle 10 includes a stop to limit the movement of the rail-gripping arm relative to the main handle member 20, thereby defining a maximum opening angle at which the rail-gripping arm 30 may be opened relative to the main handle member 20.

For the purposes of this specification, the expression "rail-gripping" shall be construed broadly as meaning attaching, locking, holding or connecting to the rail or other rail-like member such as a bar, rod, shaft, or other generally cylindrical structure.

Figure 29:
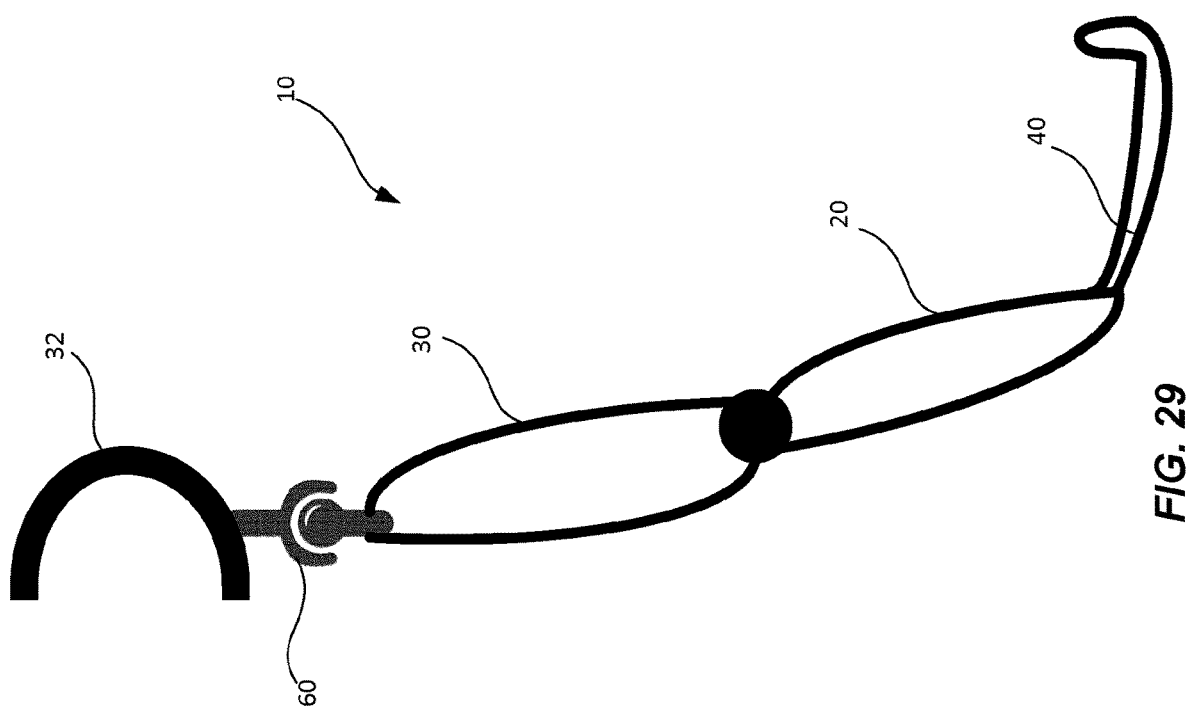
FIG. 29 is a side schematic view of a health and safety handle having a swivel joint in accordance with another embodiment.
Figure 30:
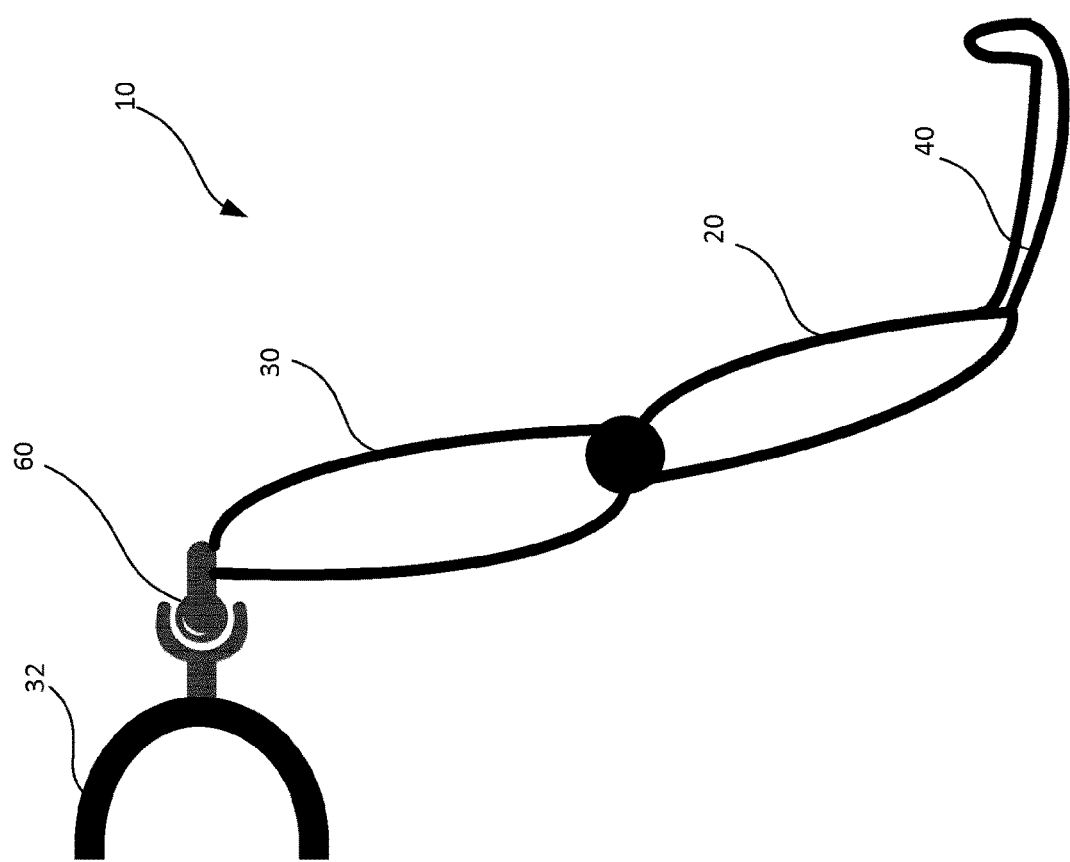
FIG. 30 is a side schematic view of a health and safety handle having a one-axis pivot in accordance with another embodiment.
Figure 31:
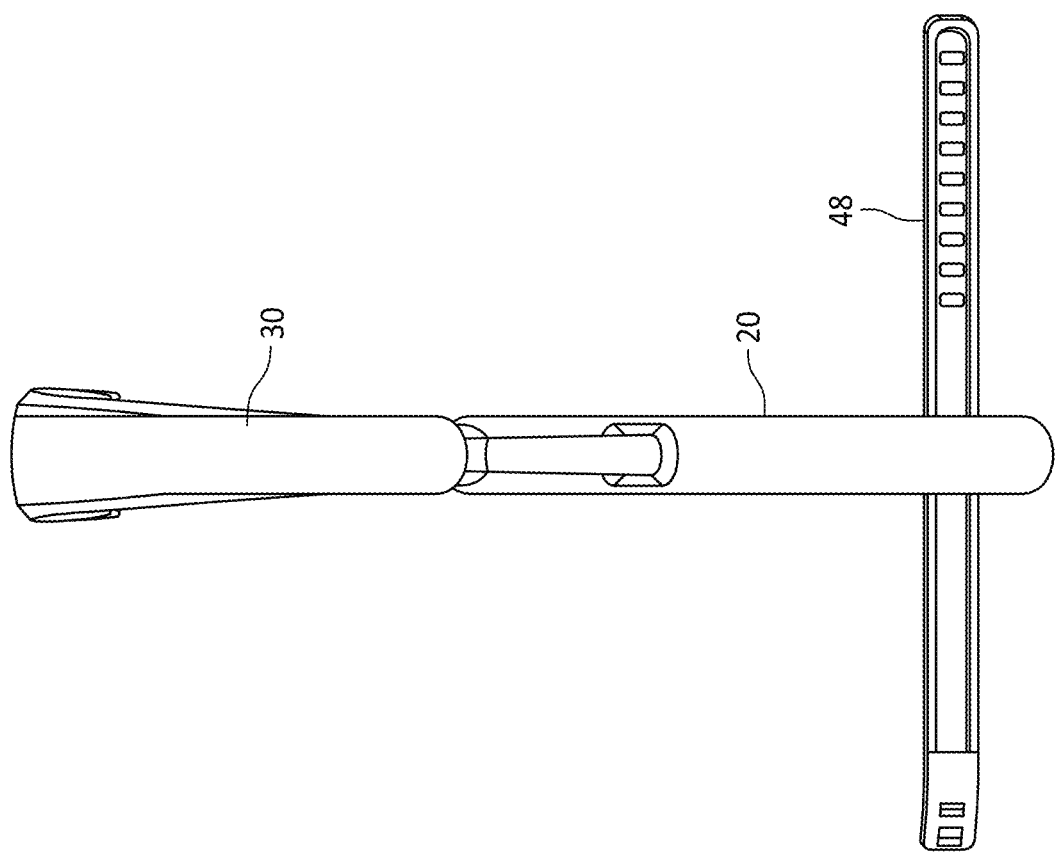
FIG. 31 depicts a band-type strap for attaching an object such as a beverage container to the health and safety handle.
Figure 32:
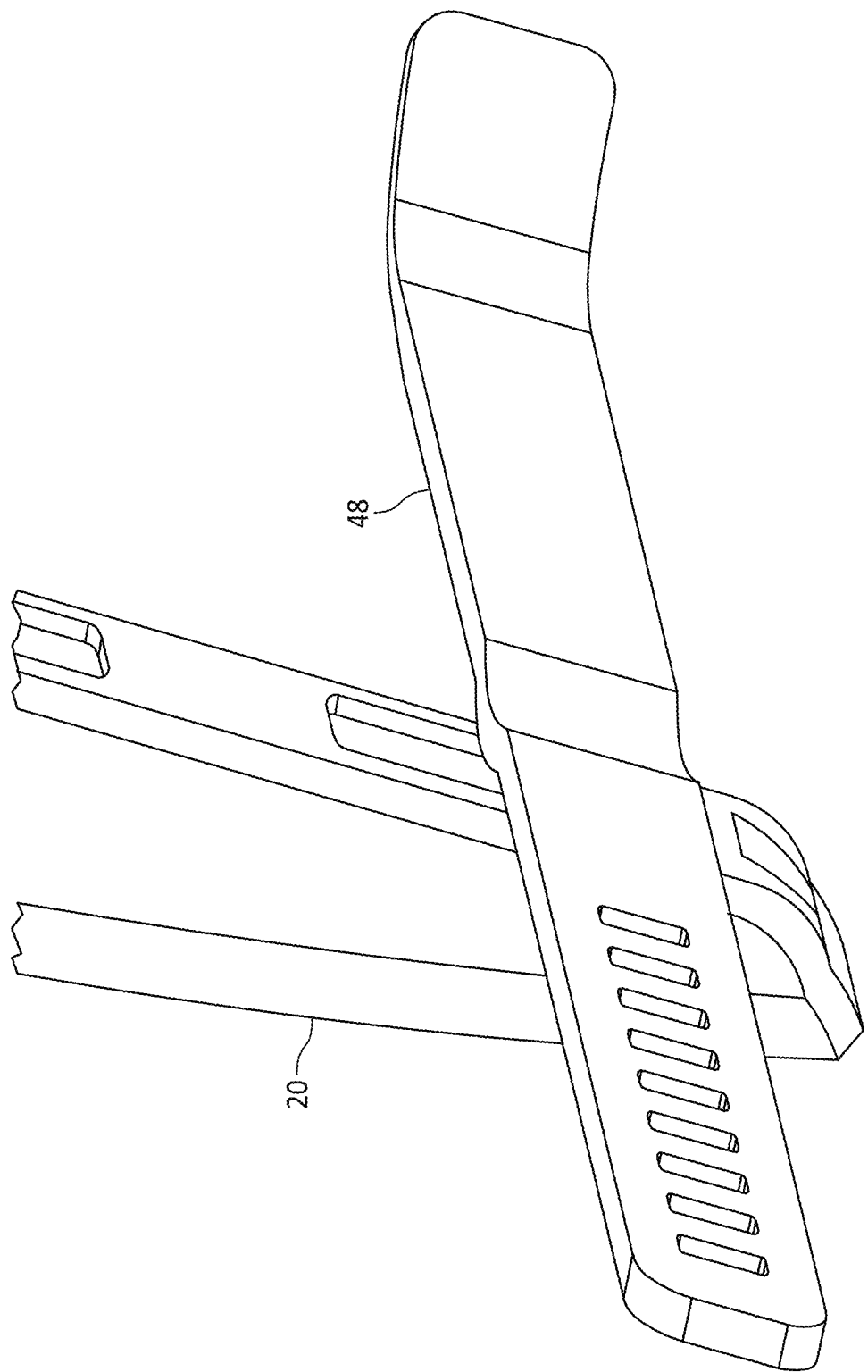
FIG. 32 is an enlarged view of the strap attached to the health and safety handle.
Figure 33:
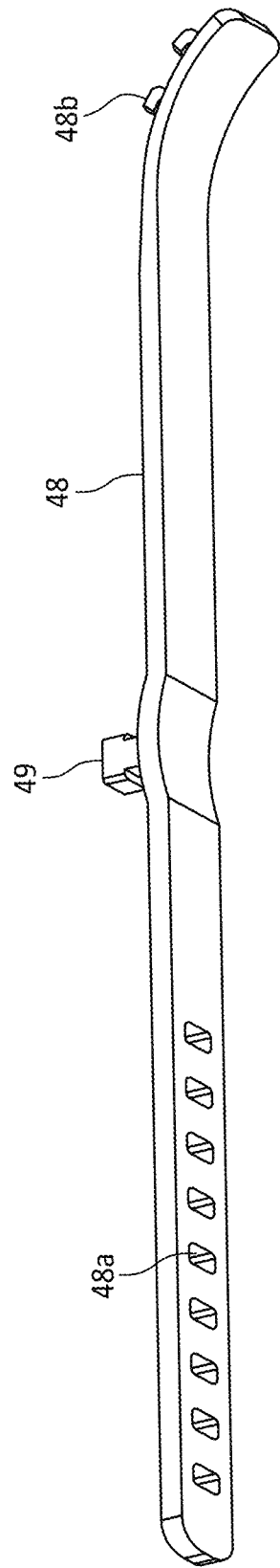
FIG. 33 is a perspective view of the underside of the strap.
Figure 34:
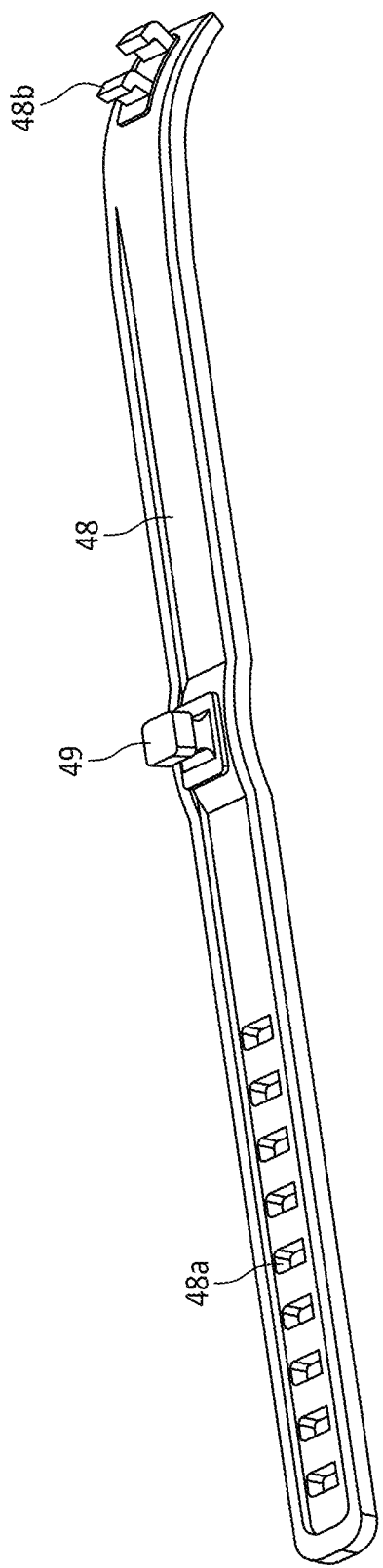
FIG. 34 is a perspective view of the top side of the strap.
Figure 35:
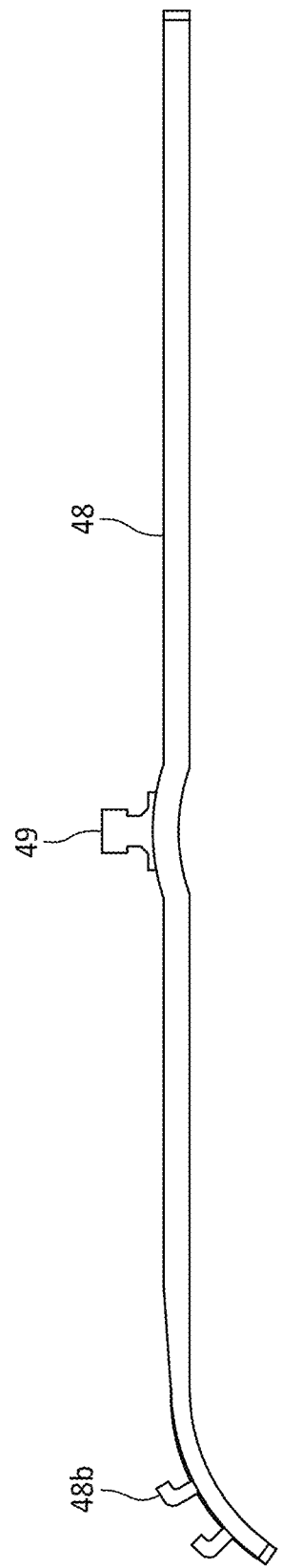
FIG. 35 is a side view of the strap.

In the illustrated embodiments, the rail-gripping arm 30 has a gripper 32 at a distal end of the rail-gripping arm 30 that is adapted, i.e. shaped and sized, to grip, attach or connect to a cylindrically shaped rail 34. In the illustrated embodiments, the gripper 32 has a generally curved inner surface, e.g. a concave surface to grip, connect or attach to a cylindrically shaped rail or pole. The gripper 32 may have flared lateral portions 33 to enable the rail-gripping arm 30 to swivel, pivot or rotate within a range of angles relative to the rail, mimicking a motion of a strap, thereby alleviating undesirably high torque on the rail-gripping arm 30. Alternatively, the gripper 32 may be pivotally mounted to the rail-gripping arm via a swivel joint, ball joint or universal joint 60 as depicted by way of example in FIG. 29, or via a one-axis pivot as depicted by way of example in FIG. 30. In the embodiment of FIG. 30, the angle between the gripper and gripping arm would remain the same; however, the gripping arm would be able to pivot within a range of angles relative to the rail.

Figure 26:
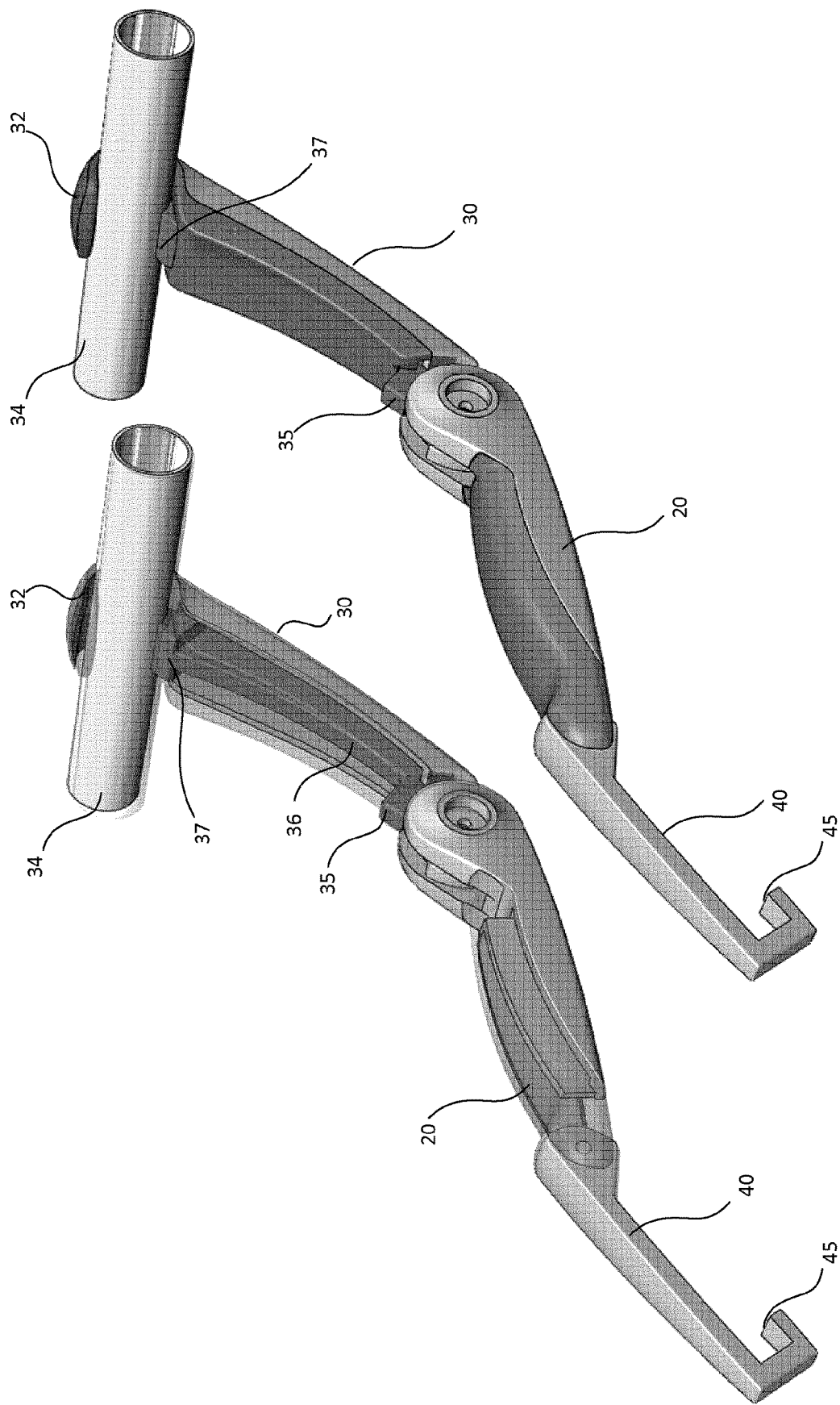
FIG. 26 also depicts internal details of the releasable locking mechanism in accordance with one embodiment of the health and safety handle.
Figure 27:
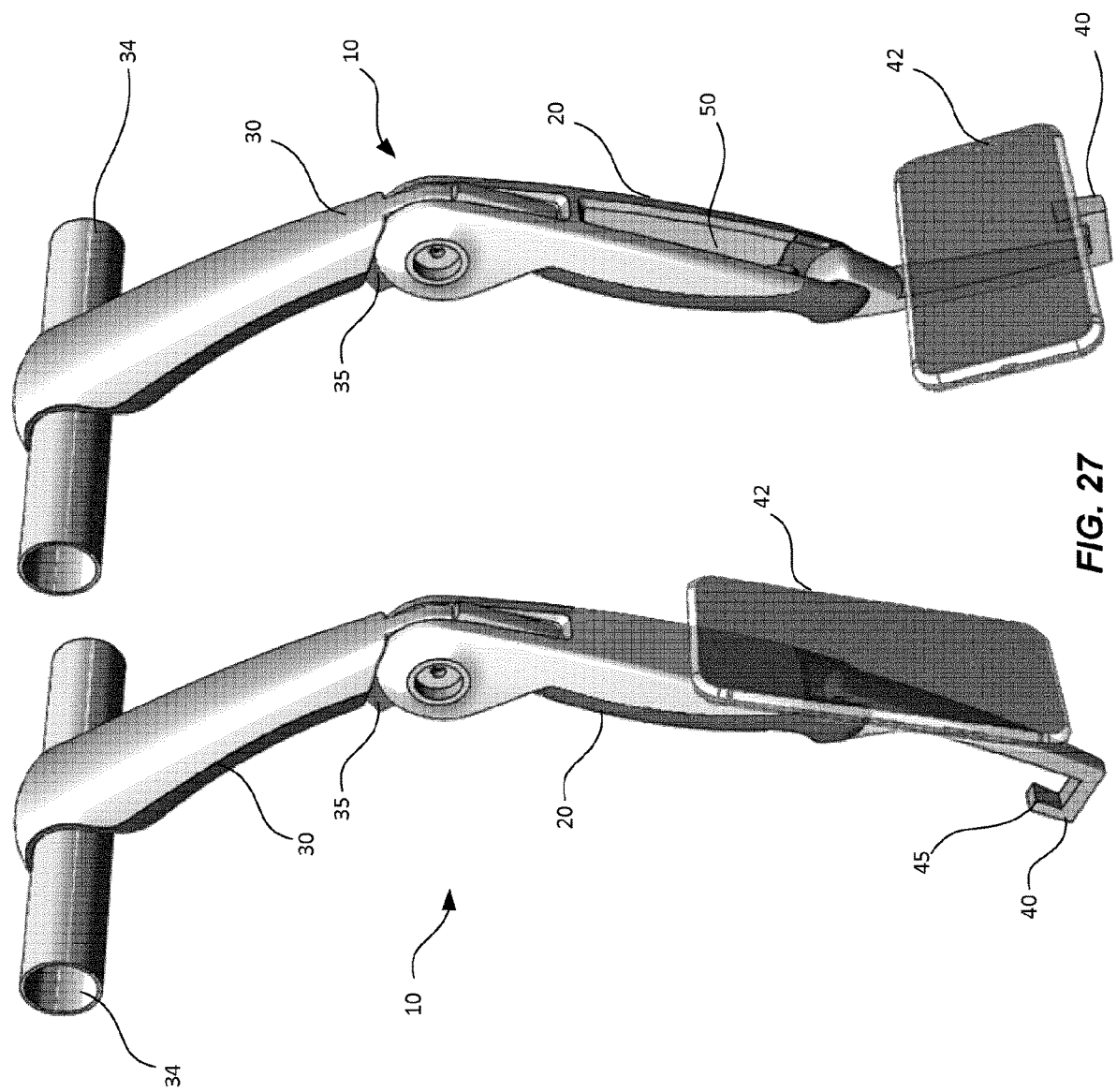
FIG. 27 depicts an embodiment of the health and safety handle holding a mobile communication device while gripping a grab rail.
Figure 28:
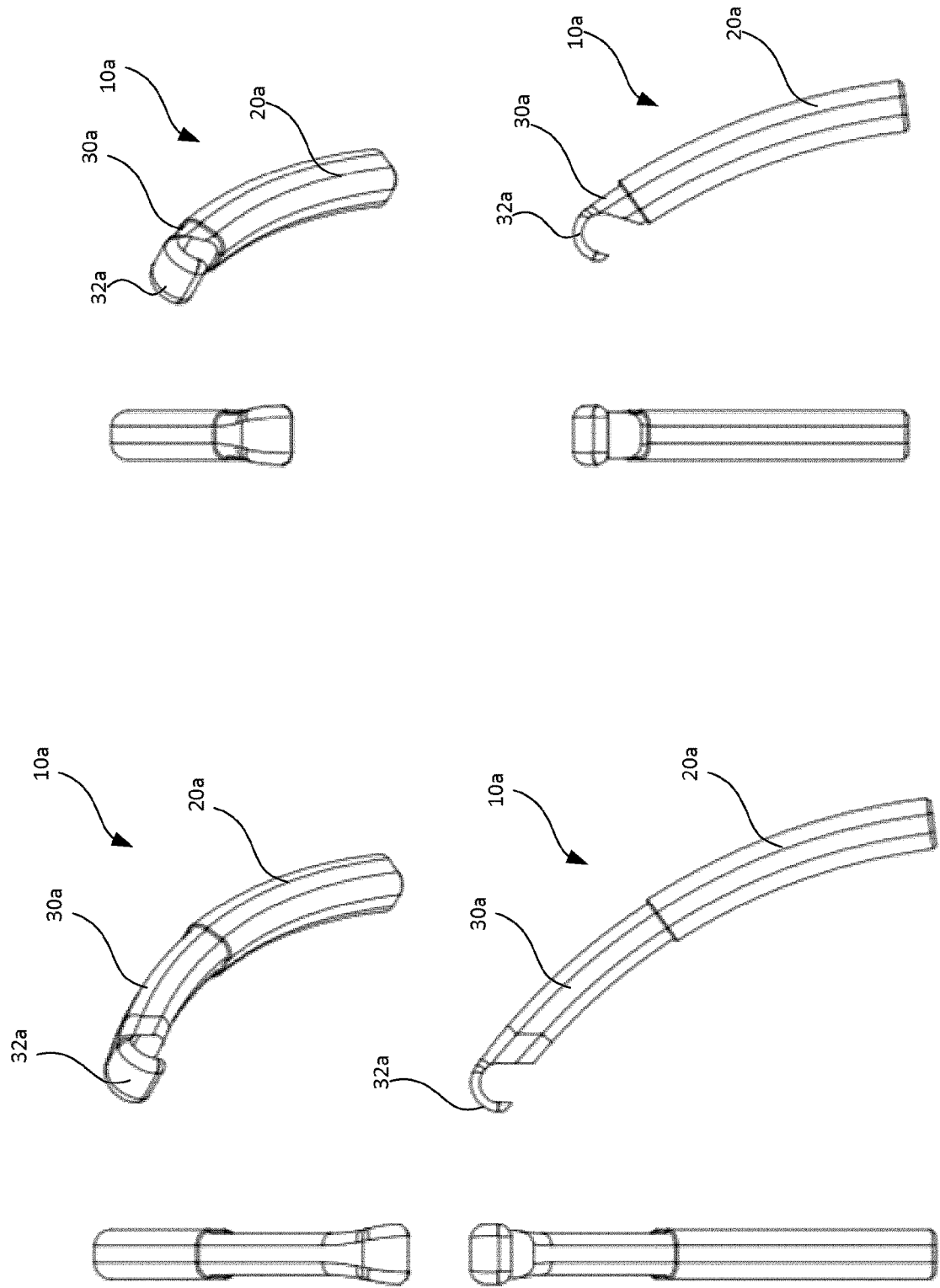
FIG. 28 are views of an another embodiment in which the health and safety handle extends and retracts telescopically.

In at least some of the illustrated embodiments, the health and safety handle 10 includes an optional grip-releasing button 35 (i.e. a push-button release) to unlock the gripper 32 from the rail 34. The grip-releasing button 35 may be pressed by the user while still grasping the main handle member 20. As depicted in FIG. 26, the grip-releasing button 35 may be part of a releasable locking mechanism 36 to unlock the gripper 32 from the rail 34. The releasable locking mechanism 36 may comprise the grip-releasing button (push-button release) 35 and a lockable rail-engaging member 37. When the grip-releasing button 35 is pressed, the releasable locking mechanism 36 causes the lockable rail-engaging member 37 to unlock the gripper 32 from the rail 34. The term "button" for the purposes of this specification shall be interpreted broadly to encompass any lever, trigger, switch or other element that actuates the locking mechanism 36. Other suitable or equivalent mechanisms may be substituted in other variants. The lockable rail-engaging member 37 may be for example a spring-loaded wedge, tongue, or like structure, extending as illustrated from a portion of the gripper 32 to lock or attach the gripper 32 to, or around, the rail 34.

The health and safety handle 10 further includes a holder 40 connected or integrated (e.g. movably connected) to a second end of the main handle member. The holder may be configured to hold a mobile communication device 42 or other object 44. The object may be, for example, a beverage container, such as illustrated in some of the figures. It will be appreciated that the object 44 held by the holder 40 may be a bag, purse, briefcase, umbrella, coat, etc.

The holder 40 may also include a hook 45 (or several hooks) as illustrated. The hook 45 may be disposed at an end of the holder as shown by way of example although the hook 45 may be disposed elsewhere on the holder 40. The hook 45 may be provided to suspend an object 44 from the hook 45 such as a bag, coat, umbrella, etc. Alternatively, the holder 40 may include more than one hook 45. The holder 40, rail-gripping arm 30 and main handle member 20 may optionally include one or more anchoring systems to simultaneously hold multiple objects, items, belongings and/or other interchangeable accessories. In one embodiment, a magnetic and/or mechanical retention element 46 is provided for retaining one or more accessories. The accessories may be, for example, a beverage container such as shown in the figures, or any other suitable object like an umbrella, shopping bag, gym bag, purse, satchel, etc. In a variant, the holder 40 may alternatively be an integrally formed protuberance extending from the second end of the main handle member 20.

In the embodiment depicted in FIGS. 31-35, a band-type strap 48 may be used to attach an object such as a beverage container to the health and safety handle. As shown in FIGS. 31-35, the strap 48 may have a magnetic or metallic anchor point 49 (or alternatively a mechanical connector, clip, protrusion or fastener) to magnetically or mechanically attach to the magnetic and/or mechanical retention element 46. In the illustrated embodiment, the strap 48 is made of a flexible or pliable material to encircle an object such as a beverage container. The strap 48 in this embodiment has a plurality of slots 48a and a plurality of notches shaped and sized to be inserted into the notches 48a to secure the strap around the object. Another type of mechanism may be used such as a clasp, clip, interlocking fastening device, etc. The shape and size of the strap 48 presented in these figures is solely exemplary and may be varied to hold any number of differently shaped and sized objects.

The health and safety handle 10 may incorporate different types of mechanisms to achieve different types of motion for the rail-gripping arm 30 relative to the main handle member 20. In the embodiments of the health and safety handle 10 illustrated in the figures, the rail-gripping arm 30 is movable either (rotatably or telescopically) between a closed (folded or retracted) posture and an open (e.g. unfolded or extended) posture. Likewise, in the illustrated embodiments, the holder 40 is movable, e.g. rotatable, relative to the main handle member 20 between a stowed position and a deployed position. In other words, in the illustrated embodiments, the rail-gripping arm 30 is rotatable (i.e. pivotable) relative to the main handle member 20 while the holder 40 is also rotatable (i.e. pivotable) relative to the main handle member 20. In the illustrated embodiments, an axis of rotation of the rail-gripping arm 30 is parallel to an axis of rotation of the holder although this is not necessarily so in other embodiments.

Although a movable/rotatable/telescopic rail-gripping arm 30 is described and illustrated, in another embodiment the rail-gripping arm 30 may be fixed to the main handle member 20 so that the rail-gripping arm 30 is immovable relative to the main handle member 20, thereby providing a fixed-length rail-gripping device. In one embodiment, as depicted in FIGS. 29 and 30, the rail-gripping arm 30 and the gripper 32 may be fixed or movably connected to a joint 60.

In some embodiments of the health and safety handle 10, the holder 40 is configured to fold onto the main handle member 20 or into a cavity 50 formed in the main handle member 20 as illustrated in some of the figures. The cavity 50 may be an elongated cavity as shown to accommodate the holder 40. The user can grasp the main handle member 20 when the holder 40 has been folded into the cavity 50 or when the holder 40 has been deployed.

In one embodiment, the health and safety handle is a telescopic health and safety handle 10a. In the embodiment depicted in FIG. 28, the telescopic health and safety handle 10a includes a rail-gripping arm 30a that is telescopically extendable and retractable relative to a main handle member 20a. As such, the telescopic health and safety handle 10a may be easily extended and retracted as depicted by way of example in FIG. 28.

In other embodiments, the health and safety handle 10 may have other mechanical or electronic elements, modules or subcomponents incorporated within the main handle member 20 and/or rail-gripping arm 30 and/or holder 40. For example, the health and safety handle 10 may house or incorporate various electronics (e.g. NFC chip, Bluetooth® chip) or mechanical tools, features, etc. The health and safety handle 10 may also, for example, include a storage compartment for keys, money, memory sticks/devices, etc.

Optionally, the health and safety handle 10 includes a battery-recharging module (or a power pack) for recharging a mobile communication device 42 while the user is simultaneously holding the health and safety handle 10, although it will be understood that the battery-recharging module may also be used to recharge the mobile communication device 42 even when the user is not holding the health and safety handle 10. The recharging may be conductive recharging via a plug or socket. The recharging may be inductive wireless recharging. The power pack may optionally be used to recharge an accessory (i.e. an electronic accessory) that is held or connected to the health and safety handle.

Optionally, the health and safety handle includes one or several light(s), e.g. an LED light, to act as a flashlight and/or safety/position lights. These may powered by an integrated power-pack. There may be one or more buttons or switches on the health and safety handle to operate the light(s), integrated and/or paired camera, etc.

Optionally, the health and safety handle includes a panic button. The panic button may be disposed, for example, on the main handle member. It may emit a high-frequency sound and/or work with a paired mobile device to automatically execute pre-programmed actions such as dialing an emergency number such as 9-1-1 in North America, automatically notifying friends/family members of emergency/distress situations, along with transmitting a live GPS location of the health and safety handle.

Optionally, the health and safety handle may include a Bluetooth® transceiver (or other short-range wireless communication system) for pairing with the mobile communication device or any other Bluetooth®-enabled electronic device.

Optionally, the health and safety handle includes a memory (i.e. a data storage). The health and safety handle may also include a microprocessor communicatively coupled to the memory via a data bus.

Optionally, the health and safety handle includes a Global Navigation Satellite System (GNSS) chip, e.g. a Global Positioning System (GPS) chip for location determination.

Optionally, the health and safety handle includes a display screen. The display screen may be interoperable with the mobile communication device. The display screen may also be used to display information about the health and safety handle or to present a user interface for independent functions of the health and safety handle. The display screen may be a touch screen.

The health and safety handle 10 is primarily designed to grip (i.e. grasp, connect, lock or attach to) a horizontal grab rail in a transit vehicle such as a bus or subway car. However, the health and safety handle may also attach to a vertical pole. The health and safety handle is useful in all instances, whether the transit vehicle is full or not, as it in addition to providing balance, stability and safety, it also isolates the user's hands from the potentially soiled/infected grab rails in a public transit vehicle thereby avoiding or at least greatly reducing the likelihood of transmission of infectious or communicable diseases from one rider to another. In addition, the health and safety handle 10 is particularly useful when the bus or subway car is full and there is inadequate access to the seats, rails and poles. The health and safety handle can extend the rider's reach to provide access to a grab rail or pole. The health and safety handle also enables the user to simultaneously hang a bag, purse or briefcase, hold a beverage container such as a sealed coffee mug, and may even hold a communication device, thus enabling the user to also interact with his or her phone, all while keeping a hand completely free.

The health and safety handle is a portable device, i.e. a personal device, that detaches or unclamps from the grab rail of the public transit vehicle after use and is meant to be carried by the user. Due to its compact design, the health and safety handle can be easily stowed in (or attached/clipped on) a handbag, backpack, briefcase, etc. or even stashed in a coat/jacket pocket.

In some embodiments, the health and safety handle 10 may be washable, i.e. is made of heat-resistant and/or waterproof materials that can be disinfected, e.g. cleaned with soap, exposed to heat, wiped with disinfecting/antibacterial wipes, sprayed with disinfectant/antibacterial solutions, etc. The health and safety handle may be resistant to heat so it can be, in at least one embodiment, placed in a dishwasher, autoclave, steam chamber or other high-temperature chamber. In at least one embodiment, the health and safety handle is made of materials that are impervious to high-concentration alcohols and/or other disinfecting chemicals. In some embodiments, some of the components of the health and safety handle may be made of antimicrobial material to inhibit survival of potentially harmful microbes, germs, viruses, bacteria with which the health and safety handle may have come into contact. The health and safety handle may be sized and shaped to meet the specifications of the rails or poles of any particular transit system. The health and safety handle may thus be compliant with one or more standards pertaining to public transit vehicles and their equipment/components.

In some embodiments, the health and safety handle, or portions thereof, may be made to resemble well-known animated characters, superheroes, or may be decorated or ornamented with the colors and/or logos of sports teams, countries, organizations, etc.

In some embodiments, the health and safety handle may include, or be compatible with a proprietary sleeve, outer case, protective cover or the like (analogous to a protective case for a mobile communications device). The sleeve, outer case or protective cover may be replaceable or detachable when worn, soiled or for personalization purposes.

For the purposes of interpreting this specification, when referring to elements of various embodiments of the present invention, the articles "a", "an", "the" and "said" are intended to mean that there are one or more of the elements. The terms "comprising", "including" and "having" are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A health and safety handle for detachably gripping a cylindrically shaped rail extending along a horizontal rail axis within a transit vehicle, including a bus, train or subway car, comprising:
    a main handle member shaped to be grasped by a user; and
    a rail-gripping arm connected to a first end of the main handle member, the rail-gripping arm having a rigid gripper with a smooth rail-contacting surface adapted to detachably grip a cylindrically shaped rail extending along a horizontal rail axis, the cylindrically shaped rail being disposed horizontally within a transit vehicle;
    wherein the rail-gripping arm telescopically extends and retracts relative to the main handle member between a closed posture and an open posture;
    wherein the rigid gripper is concave and curls from the rail-gripping arm more than 180 degrees in a plane perpendicular to the horizontal rail axis to define a downwardly angled opening for attaching to the cylindrically shaped rail; and
    wherein the rigid gripper has flared lateral portions that flare conically outwardly from the smooth rail-contacting surface relative to the horizontal rail axis to enable the rail-gripping arm to swivel relative to the cylindrically shaped rail when the rigid gripper is gripping the cylindrically shaped rail to thereby support the user while the user is standing in the transit vehicle, grasping and extending vertically the health and safety handle and detectably gripping the cylindrically shaped rail within the transit vehicle.

2. The health and safety handle of claim 1, wherein the health and safety handle further comprises a battery-recharging module for recharging a mobile communication device and/or another electronic accessory.

3. The health and safety handle of claim 1, wherein the health and safety handle further comprises a LED light to act as a flashlight and/or safety lights and/or position lights.

4. The health and safety handle of claim 1, wherein the health and safety handle further comprises a panic button.

5. The health and safety handle of claim 1, wherein the health and safety handle further comprises a Bluetooth® transceiver for pairing with a Bluetooth®-enabled electronic device.

6. The health and safety handle claim 1, wherein the health and safety handle further comprises a memory.

7. The health and safety handle of claim 1, wherein the health and safety handle further comprises a Global Navigation Satellite System (GNSS) chip.

8. The health and safety handle of claim 1, wherein the health and safety handle further comprises a display screen.

9. A health and safety handle for detachably gripping a cylindrically shaped rail extending along a horizontal rail axis within a transit vehicle, including a bus, train or subway car, comprising:

a main handle member shaped to be grasped by a hand of a user standing in a bus, train or subway car; and a rail-gripping arm connected to a first end of the main handle member, the rail-gripping arm having a rigid gripper with a smooth rail-contacting surface adapted to detachably grip a cylindrically shaped rail extending along a horizontal rail axis, the cylindrically shaped rail being disposed horizontally within the bus, train or subway car;

wherein the rail-gripping arm telescopically extends and retracts relative to the main handle member between a closed posture and an open posture;

wherein the rigid gripper is concave and curls from the rail-gripping arm more than 180 degrees in a plane perpendicular to the horizontal rail axis to define a downwardly angled opening for attaching to the cylindrically shaped rail; and wherein the rigid gripper has flared lateral portions that flare conically outwardly from the smooth rail-contacting surface outwardly relative to the horizontal rail axis to enable the rail-gripping arm to swivel relative to the cylindrically shaped rail when the rigid gripper is gripping the cylindrically shaped rail to thereby support the user while the user is standing in the bus, train or subway car, grasping and extending vertically the health and safety handle and detectably gripping the cylindrically shaped rail within the transit vehicle; and wherein the health and safety handle further comprises a battery-recharging module for recharging a mobile communication device and/or another electronic accessory.

\* \* \* \* \*